(12) United States Patent
Cao et al.

(10) Patent No.: US 9,672,319 B1
(45) Date of Patent: Jun. 6, 2017

(54) METHODS, SYSTEMS, AND ARTICLES OF MANUFACTURE FOR IMPLEMENTING ELECTRONIC DESIGNS WITH A PSEUDO-3D ANALYSIS MECHANISM

(71) Applicant: Cadence Design Systems, Inc., San Jose, CA (US)

(72) Inventors: Xiande Cao, San Jose, CA (US); Jian Liu, Dublin, CA (US); An-yu Kuo, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/754,591

(22) Filed: Jun. 29, 2015

(51) Int. Cl.
  *G06F 17/50* (2006.01)
(52) U.S. Cl.
  CPC ...... *G06F 17/5081* (2013.01); *G06F 17/5009* (2013.01); *G06F 17/5077* (2013.01); *G06F 17/5072* (2013.01)
(58) Field of Classification Search
  CPC ............ G06F 17/5081; G06F 17/5072; G06F 17/5077
  USPC ............... 716/111, 119, 129, 130, 51, 55, 54
  See application file for complete search history.

(56) References Cited

U.S. PATENT DOCUMENTS

| | | | | |
|---|---|---|---|---|
| 4,899,118 A | * | 2/1990 | Polinski, Sr. | ........... H01L 23/66 333/246 |
| 5,566,083 A | | 10/1996 | Fang | |
| 6,084,779 A | | 7/2000 | Fang | |
| 6,376,366 B1 | * | 4/2002 | Lin | ................... H01L 21/31116 257/E21.252 |
| 7,409,327 B2 | * | 8/2008 | Deliwala | ................ B82Y 20/00 257/E27.112 |
| 8,003,621 B2 | | 8/2011 | Niitsu et al. | |
| 8,682,625 B2 | | 3/2014 | Liu et al. | |
| 8,694,568 B2 | | 4/2014 | Li et al. | |
| 8,874,422 B2 | | 10/2014 | Liu et al. | |
| 9,542,515 B2 | | 1/2017 | Liu et al. | |
| 2008/0122109 A1 | * | 5/2008 | Yang | ................... H01L 21/7682 257/774 |
| 2012/0168416 A1 | * | 7/2012 | Graf | ..................... H05B 1/0227 219/209 |

(Continued)

FOREIGN PATENT DOCUMENTS

GB     2222385 A   *   3/1990          H01L 21/4807

OTHER PUBLICATIONS

"AN-1398 Printed Circuit Board Design Techniques for DS40MB200", Texas Instruments, Oct. 2005.

(Continued)

*Primary Examiner* — Phallaka Kik
(74) *Attorney, Agent, or Firm* — Vista IP Law Group, LLP

(57) ABSTRACT

Disclosed are techniques for model-based electronic design implementation with a hybrid solver. These techniques generate an extruded via from a linkage node to a reference metal plane that is added to an analysis model for at least a portion of an electronic design. The analysis model for the at least the portion is generated at least by re-establishing interconnection between the at least the portion and a linkage circuit element with the extruded via. At least the portion of the electronic design may further be implemented using the analysis or simulation results that are generated by using the hybrid solver on the model, without using three-dimensional solvers, for a three-dimensional model of the electronic design.

21 Claims, 12 Drawing Sheets

(56) References Cited

U.S. PATENT DOCUMENTS

| | | | | |
|---|---|---|---|---|
| 2013/0007692 A1* | 1/2013 | Yeh | ................... | G06F 17/5036 |
| | | | | 716/136 |
| 2013/0139121 A1* | 5/2013 | Wu | ................... | G06F 17/5036 |
| | | | | 716/113 |
| 2013/0212544 A1* | 8/2013 | Yu | ..................... | G06F 17/5045 |
| | | | | 716/55 |
| 2013/0246990 A1* | 9/2013 | Yen | ................... | G06F 17/5036 |
| | | | | 716/112 |
| 2014/0048319 A1* | 2/2014 | Pan | ................... | H05K 1/0216 |
| | | | | 174/258 |
| 2014/0096102 A1* | 4/2014 | Fu | ......................... | G06F 17/50 |
| | | | | 716/133 |
| 2014/0203894 A1* | 7/2014 | Camillo-Castillo | .. | H01P 1/2039 |
| | | | | 333/204 |
| 2014/0291819 A1* | 10/2014 | Barth | .............. | H01L 23/53276 |
| | | | | 257/659 |
| 2015/0119252 A1* | 4/2015 | Ladizinsky | .......... | B82Y 10/00 |
| | | | | 505/170 |
| 2016/0268194 A1* | 9/2016 | Yu | ..................... | H01L 23/5226 |

OTHER PUBLICATIONS

"Design Guidelines for 100 GBPS—CFP2 Interface", Altera, Jan. 16, 2014.
"Via Optimization Techniques for High-Speed Channel Designs", Altera, May 2008.

* cited by examiner

METHODS, SYSTEMS, AND ARTICLES OF MANUFACTURE FOR IMPLEMENTING ELECTRONIC DESIGNS WITH A PSEUDO-3D ANALYSIS MECHANISM

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern electronic design (e.g., IC package designs, printed circuit board or PCB designs, etc.) often include multi-layered structures to increase or maximize the available space. Accompanying the increasingly popular use of multi-layered structured structures is the analysis of the electromagnetic filed for the electronic product. Three-dimensional (3D) solvers modeling the structures and analyzing the electromagnetic field domain in the three-dimensional space may be used to analyze the electrical characteristics and perform electromagnetic simulations yet requires long and often prohibitively long runtime as well as large memory footprint to reach some reasonably accurate solutions. Pseudo-3D or two-and-a-half-dimensional (2.5D) solvers (collectively hybrid solvers or psuedo-3D solvers) have also been widely used due to their expediency and small memory footprint in reaching reasonably accurate solutions. These hybrid approaches pose a different set of problems with modern multi-layered electronic designs.

3D modeling tools and solvers model all structures of an electronic design (e.g., a printed circuit board or PCB design) in a 3D space and solve for the electrical characteristics and field domains in any direction. Because of the modeling and solving in the 3D space, the memory footprints as well as the computational costs associated with 3D solvers are often very expensive, if not prohibitively expensive. Hybrid modeling tools and solvers, on the other hand, are developed to solve for the electrical characteristics and parallel field domains (e.g., electromagnetic fields) between two parallel metal shapes.

Therefore, there exists a need for a method, system, and computer program product for provisioning measurements for constructing a simulation schematic of an electronic design across multiple design fabrics.

SUMMARY

Disclosed are method(s), system(s), and article(s) of manufacture for model-based electronic design implementation with a hybrid solver in various embodiments. Some first embodiments are directed at a method for model-based electronic design implementation with a hybrid solver. In these first embodiments, an extruded via from a linkage node may be generated and extruded to a reference metal plane that is added to an analysis model for at least a portion of an electronic design; the analysis model may be generated for the at least the portion of the electronic design by re-establishing interconnection between the at least the portion of the electronic design and a linkage circuit element with the extruded via; and the at least the portion of the electronic design may be implemented using analysis or simulation results that are generated by using the hybrid solver on the model.

In some of these first embodiments, the analysis or simulation results are generated for a three-dimensional model of the electronic design without using three-dimensional solvers. In addition or in the alternative, connectivity information may be identified; the analysis or simulation results may be generated by using the hybrid solver to solve for electrical behavior of the at least the portion of the electronic design; the analysis or simulation results may be stored in a non-transitory computer memory; and at least a portion of the analysis or simulation results may be retrieved from the non-transitory computer memory with the electronic design implementation mechanism to implement the at least the portion of the electronic design based in part or in whole upon the at least the portion of the analysis or simulation results.

In some of the first embodiments, one or more decoupling requirements may be identified; a position in the analysis model for the reference metal plane may be determined based in part or in whole upon the one or more decoupling requirements; and the reference metal plane may be added at the position in the analysis model. In some of the immediately preceding embodiments, the one or more decoupling requirements include reducing or minimizing capacitances, reducing or minimizing inductances, or reducing the capacitances and inductances. In some of the first embodiments, one or more electrical properties may be assigned to the extruded via, where the one or more electrical properties are determined from a metal shape in the at least the portion of the electronic design or from a set of artificial values.

In addition or in the alternative, a modeling characteristic for the extruded via may be de-embedded based in part or in whole upon a one or more de-embedding objectives, wherein the modeling characteristic includes an electrical properties or a physical property for the extruded via. In some of these immediately preceding embodiments, one or more de-embedding objectives may be identified based in part or in whole upon one or more electrical characteristics of the at least the portion of the electronic design, the reference metal plane, and the extruded via; and one or more modeling characteristics may be determined for the extruded via, wherein the one or more modeling characteristics include at least one of one or more electrical properties, one or more physical properties, or a combination of at least one electrical property and at least one physical property for the extruded via.

In some of the first embodiments, a part of connectivity information between the linkage node and a linkage circuit element may be removed; the part of the connectivity information may be further updated by re-establishing interconnection between at least the extruded via and the linkage circuit element; and the connectivity information, which has been updated, may be stored in a non-transitory computer memory. In some of the first embodiments, the analysis model for the at least the portion of the electronic design may be constructed at least by including the reference metal plane and the extruded via in the analysis model; and the analysis model may be forwarded to the hybrid solver as an input model for the hybrid solver to determine electrical behavior of the at least the portion of the electronic design and to include the electrical behavior in the analysis or simulation results.

In some of the immediately preceding embodiments, the at least the portion of the electronic design may be analyzed or simulated by using the hybrid solver on the analysis model to determine the electrical behavior of the at least the portion of the electronic design; or one or more return paths or one or more electrical parameters may be determined for the at least the portion of the electronic design. In some of the first embodiments, a first position in the analysis model may be determined for a first reference metal plane based in part or in whole upon one or more decoupling requirements; and the first reference metal plane may be added at the first position in the analysis model. In some of the first embodiments, a via clearance may be determined for one or more extruded vias including the extruded via. In addition or in the alternative, a medium for an artificial region created by the reference metal plane may be modeled with one or more artificial properties. At least one artificial property of the one or more artificial properties of the medium for the artificial region in some of these embodiments.

Some embodiments are directed at one or more hardware mechanisms that include and/or function in conjunction with at least one micro-processor as well as other related components or architectures of one or more computing systems and may be invoked to perform any of the methods, processes, or sub-processes disclosed herein. The hardware system may include one or more variants of a design implementation mechanism, a multi-fabric probing mechanism, a multi-fabric netlisting mechanism, a multi-fabric analysis mechanism, a multi-fabric checking and/or verification mechanism, and/or a multi-fabric view correlation mechanism in some embodiments.

Each of these mechanisms may include or function in tandem with electrical circuitry and one or more microprocessors each having one or more processor cores to perform its intended functions. The hardware system may further include one or more forms of non-transitory machine-readable storage media or persistent storage devices to temporarily or persistently store various types of data or information, various design rules, various libraries, selected and selectable targets, or any other suitable information or data, etc. A mechanism is initialized in a computing system so that the software portion of the mechanism is stored in memory (e.g., random access memory) to be executed by one or more processors or processor cores off the computing system to perform at least a part of the functionality of the mechanism. Some illustrative modules or components of the hardware system may be found in the System Architecture Overview section below.

Some embodiments are directed at an article of manufacture that includes a non-transitory machine-accessible storage medium having stored thereupon a sequence of instructions which, when executed by at least one micro-processor or at least one processor core, causes the at least one micro-processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for verifying connectivity of an electronic design are described below with reference to FIGS. 1-4.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 4 illustrates a computerized system on which a method for constructing a model for electrical analyses or electromagnetic simulation of an electronic design with a

DETAILED DESCRIPTION

Figure 1A:
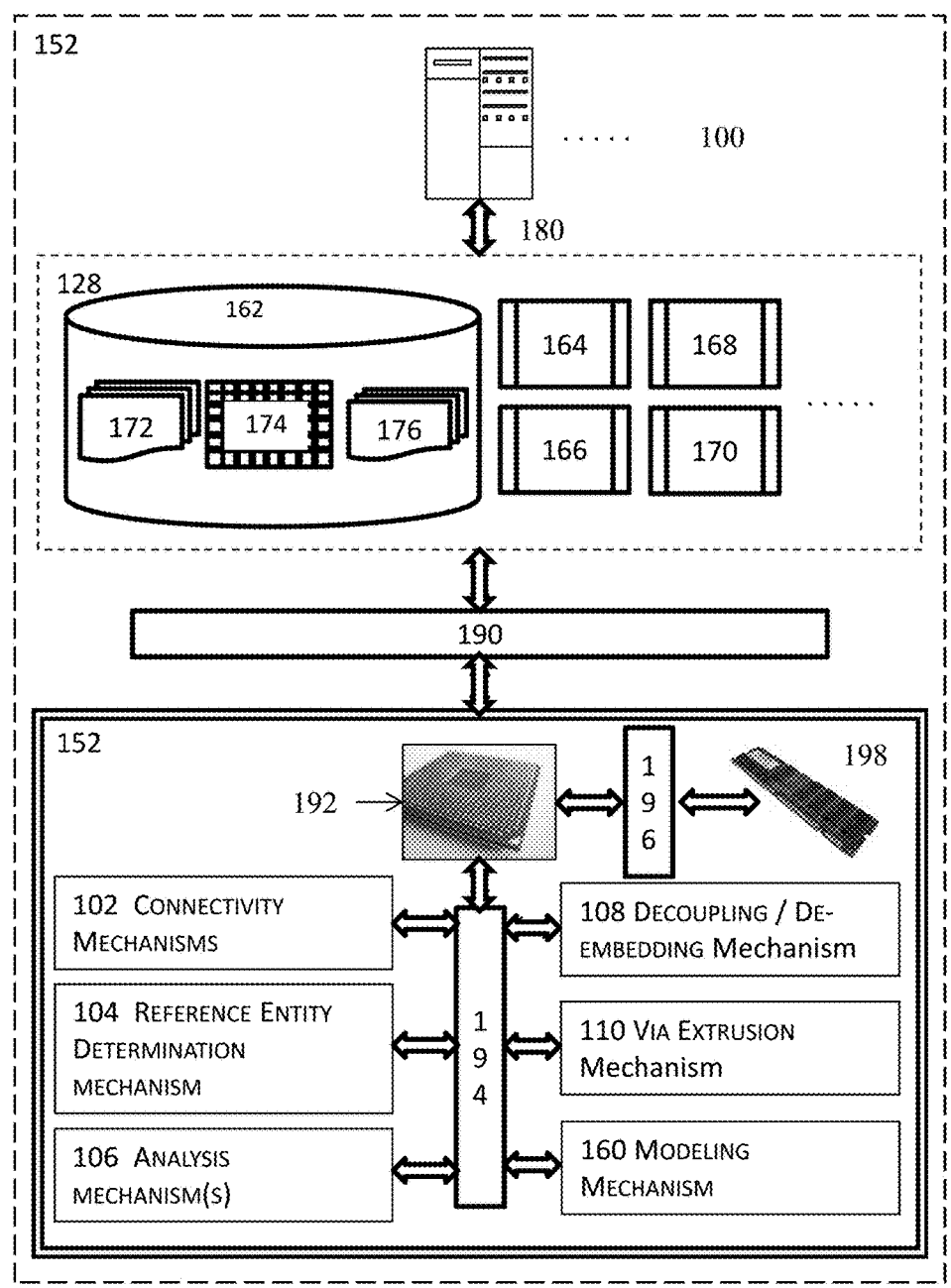
FIG. 1A illustrates a high level schematic block diagrams for implementing electronic designs with pseudo-3D analysis mechanisms in one or more embodiments.

Various embodiments are directed to a method, system, and computer program product for constructing a model for electrical analyses or electromagnetic simulation of an electronic design with a hybrid solver while accurately accommodating the behaviors of circuit components outside the parallel field domains. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of various embodiments, unless otherwise specifically described in particular embodiment(s) or recited in the claim(s). Where certain elements of embodiments may be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration. More details about various processes or modules to implement various embodiments are further described below with reference to FIGS. 1-4.

With various techniques described herein, vias not completely encompassed within parallel field domains may be more accurately modeled and solved for with hybrid solvers without resorting to 3D solvers. These techniques may further eliminate or reduce artificial effects arising out of the extruded vias and/or the added reference plane(s) by using a de-embedding process. In some embodiments, these techniques may further model a low inductance medium for an artificial region created by introduction of the reference plane(s) so as to reduce, minimize, or eliminate the effects caused by the extruded via portions and/or the reference plane(s).

For example, these techniques may model a low inductance, capacitance, or resistance medium for the space encompassing the extruded portion of the vias so that the extruded vias exhibit sufficiently low inductance, capacitance, and/or resistance value (e.g., inductance, capacitance, or resistance below a threshold value) or even zero or close to zero inductance, capacitance, or resistance value.

In some embodiments where no such vias exists, and the two parallel metal shapes connect to other linkage circuit elements through, for example, pins, pads, ports, etc., these techniques may create and extrude vias from the linkage nodes wherein electronic circuit was originally connected to the linkage circuit elements. In these embodiments, the entire space between the top surface of metal shape from which the vias are extruded and the reference metal plane may be modeled as a low inductance, capacitance, or resistance medium.

Moreover, without having a via to extrude from, these techniques may further determine the size of the via. In some embodiments, a sufficiently large diameter may be chosen for via extrusion to reduce the inductance resulting from the introduction of the extruded via. In some other embodiments, any diameter values may be selected for the extruded vias because the subsequent de-embedding mechanism may eliminate or reduce undesirable side effects such as inductance, capacitance, and/or resistance caused by the extruded vias. In some embodiments, these techniques may even model the extruded vias with inductance, capacitance, and/or resistance value that is close to zero but is sufficient to maintain stability of numerical methods (e.g., circuit elements having absolute zero inductance are very difficult solve and may thus cause numerical instability.)

The location of the reference metal plane may be determined in such a way to minimize disturbance to the behavior of the original electronic design in some embodiments. In some embodiments, the reference metal plane may be spaced sufficiently far away from the metal shapes to reduce the capacitance caused by the extruded vias. In these embodiments, placing the reference metal plane sufficiently far away from the circuit elements (and hence long via extrusions) reduce or nearly eliminate the resulting capacitance between the metal shape and the reference metal plane. The de-embedding mechanism may be further invoked to reduce or eliminate the inductance caused by the extruded vias.

In some other embodiments, the reference metal plane may be spaced sufficiently close to the metal shapes to reduce or nearly eliminate the inductance caused by the extruded vias and hence reducing or entirely eliminating resonance or coupling effects between the reference metal plane and one or more other circuit components. Placing the reference metal plane close to the metal shapes may nevertheless cause high capacitance in the artificial parallel field domain between the reference metal plane and the parallel metal plate. The de-embedding mechanism may be further invoked to reduce or nearly eliminate the capacitance caused by the extruded vias.

One of the advantages of these techniques described herein is the ability to model circuit components outside parallel field domains and the ability as extruded vias to solve for various electrical characteristics and perform electromagnetic simulations for electronic designs by using a hybrid solver, without resorting to a 3D solver. In other words, these techniques leverage the small memory footprint and small computation cycles of hybrid solvers while providing an accurate model for circuit components outside parallel field domains.

Another advantage of these techniques is that, depending upon the intent or functioning of an electronic design or a portion thereof, the reference plane may be determined to alleviate or at least reduce some undesirable effects arising out of via extrusion. The artificial space from extruded via to the reference plane may also be modeled in a way to reduce or eliminate at least some undesirable effects. An added advantage is the use of the de-embedding mechanism to further compensate for the undesirable effects caused by via extrusions.

Unlike conventional approaches, the techniques described herein first identify linkage circuit elements of an electronic design, disconnect the connections between the linkage circuit elements to other circuit elements or ports, and extrude vias from each of the linkage circuit element to a reference metal plane. A linkage circuit element may include a circuit component (e.g., a via, a port, a pin, etc.) that connects a parallel or nearly parallel (hereafter parallel) plate structure to other circuit components or ports or even a node at which the parallel plate structure is connected to other circuit components or nodes. These techniques then reconnect these other circuit elements or ports to the corresponding ends of the extruded vias to complete the circuitry to complete the model. By introducing the reference metal plane and carefully placing the reference metal plane with respect to the original design, all vias or interconnections of the original electronic design now exist in parallel field domains. Various analyses and/or simulations may be performed with the model and a hybrid solver.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1A illustrates a high level schematic block diagrams for constructing a simulation schematic of an electronic design across multiple design fabrics in one or more embodiments. More specifically, FIG. 1A illustrates an illustrative high level schematic block diagrams for constructing a simulation schematic of an electronic design across multiple design fabrics and may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise a floorplanner, a global routing engine, and/or a detail routing engine 164, a layout editor 166, a design rule checker 168, a verification engine 170, etc.

The one or more computing systems 100 may further write to and read from a local or remote non-transitory computer accessible storage 162 that stores thereupon data or information such as, but not limited to, one or more databases (174) such as schematic design database(s) or physical design database(s), electronic circuit design specification database(s), various statistics, various data, rule decks, various design rules, constraints, etc. (172), or other information or data (176) that may be used to facilitate the performance of various functions to achieve the intended purposes.

In some embodiments, the one or more computing systems 100 may include or, either directly or indirectly through the various resources 128, invoke a set of mechanisms 152 including hardware mechanisms and software modules or combinations of one or more hardware mechanisms and one or more software modules that may comprises one or more connectivity mechanisms 102 to identify, traverse, modify, establish, or re-establish how circuit component designs (e.g., designs for nets, net segments, devices, etc.) are interconnected in an electronic design and a reference entity determination mechanism 104 to identify, determine, create, or modify reference entities (e.g., nodes, reference planes, etc.) for an electronic design. More details about the reference entities will be described in subsequent sections with reference to FIGS. 1B-3B.

The set of mechanisms 152 may further optionally include one or more analysis mechanisms 106 (e.g., a two-dimensional solver, a hybrid or two-and-a-half-dimensional or 2.5D solver, a three-dimensional solver, or any combinations thereof, etc.) to perform analyses or simulations for electronic designs, a decoupling and de-embedding mechanism 108 to decouple and/or de-embed side effects introduced by the application of some of the techniques described herein, a via extrusion mechanism 110 to apply via extrusion techniques described herein, and a modeling mechanism 160 to construct a model for electrical analyses or electromagnetic simulation of an electronic design with a hybrid solver while accurately accommodating the behaviors of circuit components outside the parallel field domains.

A hybrid or 2.5D solver may comprise a simulator that is substantially similar to a two-dimensional simulator or solver with one or more exceptions. In some embodiments, a hybrid or 2.5D solver receives and analyzes a model that is constructed in a two-dimensional space. One similarity between a hybrid or 2.5D solver and a two-dimensional solver is that both solvers determine the characteristics of a model in the two-dimensional space in which the model is constructed. Another similarity between a hybrid or 2.5D solver and a two-dimensional solver is that both solvers operate on a two-dimensional, in-plane model, whereas a 3D solver or simulator operates on a 3D model. Nonetheless, one exception or difference between a hybrid or 2.5D solver and a two-dimensional solver is that a hybrid or 2.5D solver can calculate one or more characteristics of the model in the third dimension that is not used to represent the model.

In addition or in the alternative, another exception is that a hybrid or 2.5D solver may determine certain characteristics (e.g., currents, voltages, etc.) in the two-dimensional space where the model is constructed as well as the electromagnetic field domains in the three-dimensional space. In contrast, a three-dimensional solver determines all characteristics (currents, voltages, electromagnetic field domains, etc.) in a three-dimensional space.

In an analysis mechanism or simulator including one or more hybrid solvers, three-dimensional fields (e.g., three-dimensional electromagnetic fields) in a complex three-dimensional electronic design may be decomposed into a plurality of models such as the analysis model constructed with various techniques described herein. Each model may be simulated or analyzed with one or more corresponding solvers that operate upon the model to generate equally or approximately accurate analysis or simulation results as those obtained with three-dimensional solvers, without using three-dimensional solvers. These non-3D solvers include, for example, an electromagnetic filed solver, a circuit solver, a plane solver, a transmission line solver, or any combinations thereof, etc. utilizing various numerical techniques (e.g., finite element methods, finite difference time-domain methods, boundary element methods, etc.) that are deemed appropriate. The analysis mechanism or simulator may, of course, include a 3D-solver to solve 3D models in some embodiments.

In addition to the analysis models constructed with various techniques described herein, the analysis mechanism for complex 3D electronic designs may also include various other models for correctly modeling and solving complex electronic designs. These additional models may include one or more of, for example, s-parameter models, transmission line models, plane and medium models including plane and medium parameters, or any combinations thereof. These non-3D solvers operating on and solving models of an electronic design without resorting to 3D solvers not only conserve computation resources in terms of computation cycles and memory footprint but also enhance performance of the overall analysis mechanism. Some numerical experiments have evidenced over 1000-times gain in simulation or analysis speed.

It shall be noted that the term model described herein includes an analysis model that is provided to a hybrid solver or simulator to determine various characteristics of the model (e.g., electrical behavior). This "model" may be distinguished from an electronic design itself or other models for the electronic design in that the model for the hybrid or 2.5D solver is constructed for simulating or analyzing the underlying electronic design and may include one or more artificial components (e.g., one or more reference plane, one or more extruded vias, etc.) which are not a part of the electronic design. Throughout this disclosure, the terms "model" and "analysis model" may be used interchangeably to refer to the model that is provided to a solver or simulator as described immediately above.

These various mechanisms described herein may function alone or in conjunction with one or more other mechanisms to perform their intended functions and to achieve their intended purposes. For example, the via extrusion mechanism 110 may invoke (e.g., through one or more application programming interface or API calls) or function in conjunction with the reference entity determination mechanism to extrude a via from a node to a reference plane, both of which are determined by the reference entity determination mechanism 104. As another example, the one or more connectivity mechanisms 102 may also invoke or function in conjunction with the reference entity determination mechanism 104 to determine and create nodes. The one or more connectivity mechanism 102 may further invoke or function in conjunction with the via extrusion mechanism 110 to re-establish the interconnection between extruded vias and respective external circuitry or ports.

In some embodiments, the computing system 100 may include the various resources 128 such that these various resources may be invoked from within the computing system via a computer bus 180 (e.g., a data bus interfacing a microprocessor 192 and the non-transitory computer accessible storage medium 198 or a system bus 190 between a microprocessor 192 and one or more engines in the various resources 128). In some other embodiments, some or all of these various resources may be located remotely from the computing system 100 such that the computing system may access the some or all of these resources via a computer bus 180 and one or more network components.

The computing system may also include one or more mechanisms in the set of mechanisms 152. One or more mechanisms in the set 152 may include or at least function in tandem with a microprocessor 192 via a computer bus 194 in some embodiments. In these embodiments, a single microprocessor 192 may be included in and thus shared among more than one mechanism even when the computing system 100 includes only one microprocessor 192. A microprocessor 192 may further access some non-transitory memory 198 (e.g., random access memory or RAM) via a system bus 196 to read and/or write data during the microprocessor's execution of processes.

Figure 1B:
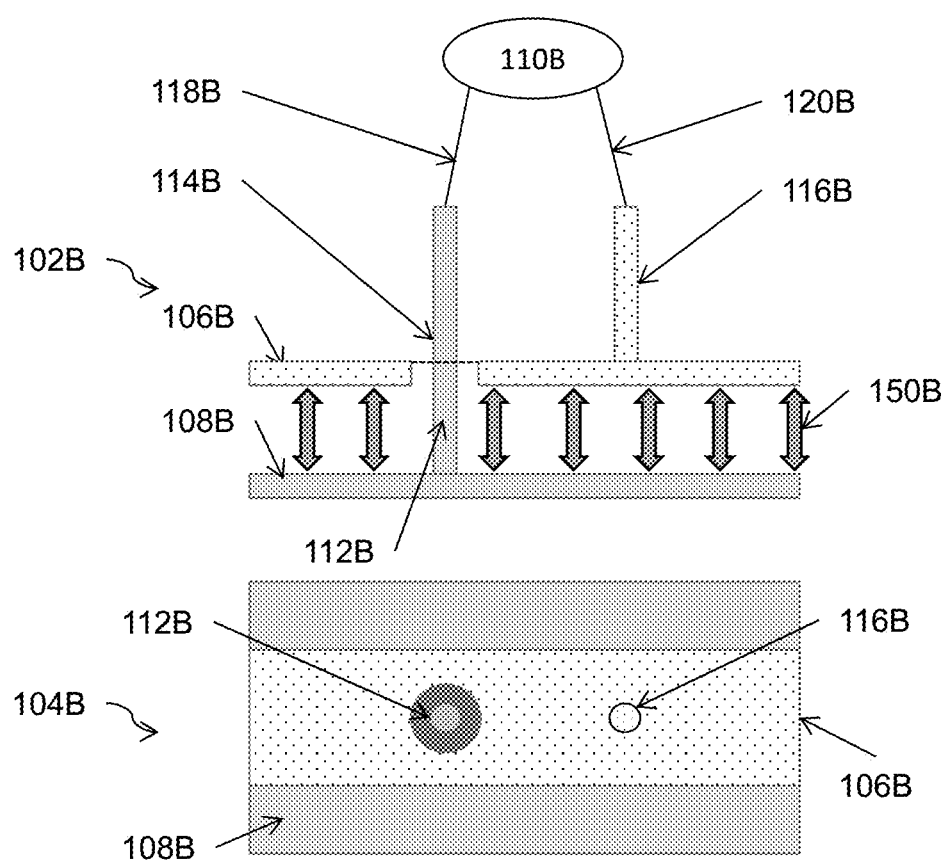
FIG. 1B illustrates an in-plane, side view of a simplified electronic design including a pair of parallel metal shapes that are interconnected to other ports or circuitry through two vias in one or more embodiments.

FIG. 1B illustrates an in-plane, side view of a simplified electronic design including a pair of parallel metal shapes that are interconnected to other ports or circuitry through two vias in one or more embodiments. 3D modeling tools and solvers model all structures of an electronic design (e.g., a printed circuit board or PCB design) in a 3D space and solve for the electrical characteristics and field domains in any direction. Because of the modeling and solving in the 3D space, the memory footprint as well as the computational costs associated with 3D solvers is often very expensive, if not prohibitively expensive. Hybrid modeling tools and solvers, on the other hand, are developed to solve for the electrical characteristics and parallel field domains (e.g., electromagnetic fields) between two parallel metal shapes.

For metal shapes in a multi-layered structure of an electronic design, hybrid solvers may provide satisfactory accuracy. For interconnections between these pairs of parallel metal shapes to other ports or circuitry, hybrid modeling tools and solvers may nevertheless fall short. For example, FIG. 1B illustrates an in-plane, side view of a simplified electronic design including a pair of parallel metal shapes 106B and 108B that are interconnected to one or more ports or circuitry (collectively linkage circuit elements or one or more linkage circuit elements) 110B through, for example vias 112B and 116B and interconnects 118B and 120B. These one or more linkage circuit elements 110B may include, for example, a power plane, a ground plane, or a signal layer.

View 104B depicts the top view of the same, simplified electronic design. Hybrid solvers may model and solve the parallel field domain 150B between the two metal shapes 106B and 108B. Nonetheless, the electromagnetic field from, for example, via 114B cannot be accurately modeled or solved with hybrid solvers due to the axis-symmetric nature of such electromagnetic field with respect to the axis of the via. For the portion 112B of the via between the metal shapes 106B and 108B, hybrid solvers may provide sufficiently satisfactory results. Nonetheless, hybrid modeling tools and solvers may not even be able to accurately solve for portion 114B (the portion above metal shape 106B) of the same via that exists outside any parallel field domains. Hybrid solvers also face the same challenge when trying to model and solve for the portion of the via 114B that lies completely outside the only parallel field domain 150B in this simplified electronic design.

Figure 1C:
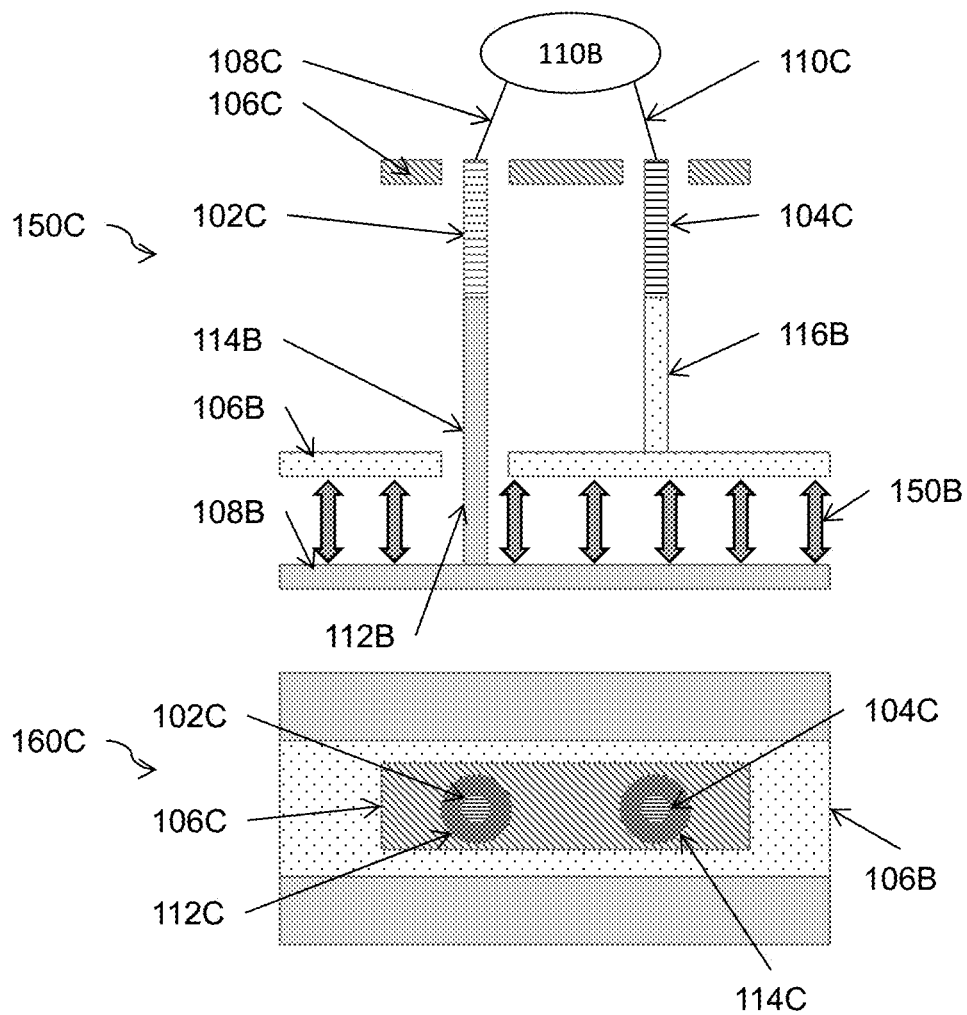
FIG. 1C illustrates an application of extruded via techniques to construct a model for electrical analyses or electromagnetic simulation of the simplified electronic design illustrated in FIG. 1B with a hybrid solver while accurately accommodating the behaviors of circuit components outside the parallel field domains in one or more embodiments.

FIG. 1C illustrates an application of extruded via techniques to construct a model for electrical analyses or electromagnetic simulation of the simplified electronic design illustrated in FIG. 1B with a hybrid solver while accurately accommodating the behaviors of circuit components outside the parallel field domains in one or more embodiments. In these one or more embodiments, rather than attempting to analyze the design having a portion 114B of the first via and the second via 116B outside any parallel field domains, the location of a first reference plane 106C may be determined, and the first reference plane 106C may be added to the model of the in-plane, side view of the simplified electronic design.

This first reference plane 106C may inherit the electrical and/or physical properties of a metal shape (e.g., metal shape 106B) in some embodiments. In some other embodiments, the electrical and/or physical properties of the first reference plane may be determined and modeled to reduce, minimize, or completely eliminate undesirable disturbances to the original behavior of the electronic design. For example, the first metal plane in the model may be modeled as a low inductance, low capacitance, or low resistance medium.

It shall be noted that the first reference plane or any other reference planes serving identical or substantially similar purposes may be modeled with some thickness that may be determined based in part or in whole upon one or more criteria including, for example, maintaining numerical stability, reducing or minimizing undesirable disturbances to the original behavior of the electronic design, the ease of modeling, etc. Therefore, the thickness of the first reference plane 106C is presented in view 150C of FIG. 1C for illustration and explanation purposes and does not necessarily indicate the actual thickness of a first reference plane. Once the first reference plane 106C is added to the model of the simplified electronic design, the original connectivity between the original vias (114B and 116B) and one or more linkage circuit elements 110B may be removed.

In addition, the first via including the portions 114B and 112B may be extruded to the first reference plane 106C. In FIG. 1C, this extruded portion is represented by 102C. The first via may be extruded to the bottom surface, the top surface, or any surface in between the top surface and the bottom surface of the first reference plane 106C. In some embodiments, the extruded portion 102C is extruded so that the extruded via (including 102C, 114B, and 112B) does not protrude beyond the top surface of the first reference plane 106C to avoid creating another portion of the first via outside parallel field domains. Similarly, the second via 116B may also be extruded to the first reference plane 106C by adding the extruded portion 104C to the second via 116B.

With the extruded first via (including 102C, 114B, and 112B) and second via (including 104C and 116B), the connectivity to one or more linkage circuit elements 110B may be re-established with the interconnects 108C (between 102C and 110B) and 110C (between 104C and 110B). In some embodiments, a reference plane comprises a two-dimensional geometric entity (e.g., a two-dimensional plane) or a three-dimensional geometric entity (e.g., a three-dimensional plate with a certain thickness) in a three-dimensional space for the electronic circuit design (although a hybrid or 2.5D solver is used to solve the electrical behavior of the three-dimensional electronic circuit design). The same reference plane comprises a one-dimensional geometric entity (e.g., a line segment) or a two-dimensional geometric entity (e.g., a plane of a polygonal shape) in the constructed model for a portion of the electronic design of interest to be solved by the hybrid or 2.5D solver. For example, a reference plane in a model constructed for a hybrid or 2.5D solver may constitute a two-dimensional plane having a polygonal shape in some embodiments. In these embodiments, the de-embedding techniques may be applied to the reference plane as described below with reference to, for example, FIG. 2A.

View 160C of FIG. 1C illustrates the top view of the model while these one or more linkage circuit elements 110B are not shown in view 160C. The width and/or length of the first reference plane 106C may be optionally determined based on a number of criteria including, for example, maintaining numerical stability, reducing or minimizing undesirable disturbances to the original behavior of the electronic design, the ease of modeling, etc. The "via clearance" 112C for the extruded portion 102C and 114C for the extruded portion 104C may be determined in an identical or substantially similar manner as that for an anti-pad, which represents spacing between a via and the connection to adjacent structures.

For example, the via clearance 112C (or 114C) may be determined based in part or in whole upon the capacitance associated with the extruded via (102C, 114B, and 112B) and/or the impedance of the extruded via. A via clearance need not be circular and may have other shapes such as an oval shape or other suitable shapes based on one or more factors or criteria. For example, the size and/or shape of a via clearance may be determined based in part or in whole upon a requirement or preference of compensating for, reducing, or minimizing excessive capacitances. Other factors or criteria that may be accounted for in the determination of the size and/or shape of a via may include, for example, the width of the interconnect or trace connected to the via, the thickness of a board or layer through which the via passes, the board or layer stack-up in the vicinity of the via of interest, the material properties (e.g., dielectric constant, the loss tangent, etc.) of the board or layer, or any combinations thereof.

In some embodiments, a via clearance may be shared for two or more vias. In some embodiments, the width and or the length of first reference plane 106C may be determined based in part or in whole upon the "via clearance". For example, the width of the first reference plane 106C may be determined by adding a sufficient amount on one side or both sides of the "via clearance" 112C to accommodate the return path of alternating current (AC) at an operating frequency due to the skin effects. In some embodiments, a reference plane may be modeled to have the same width and/or length of the metal shape that causes one or more vias to exist outside parallel field domains. For example, the first reference plane 106C may be modeled to have the same length and/or width as metal shape 106B in some embodiments.

Figure 1D:
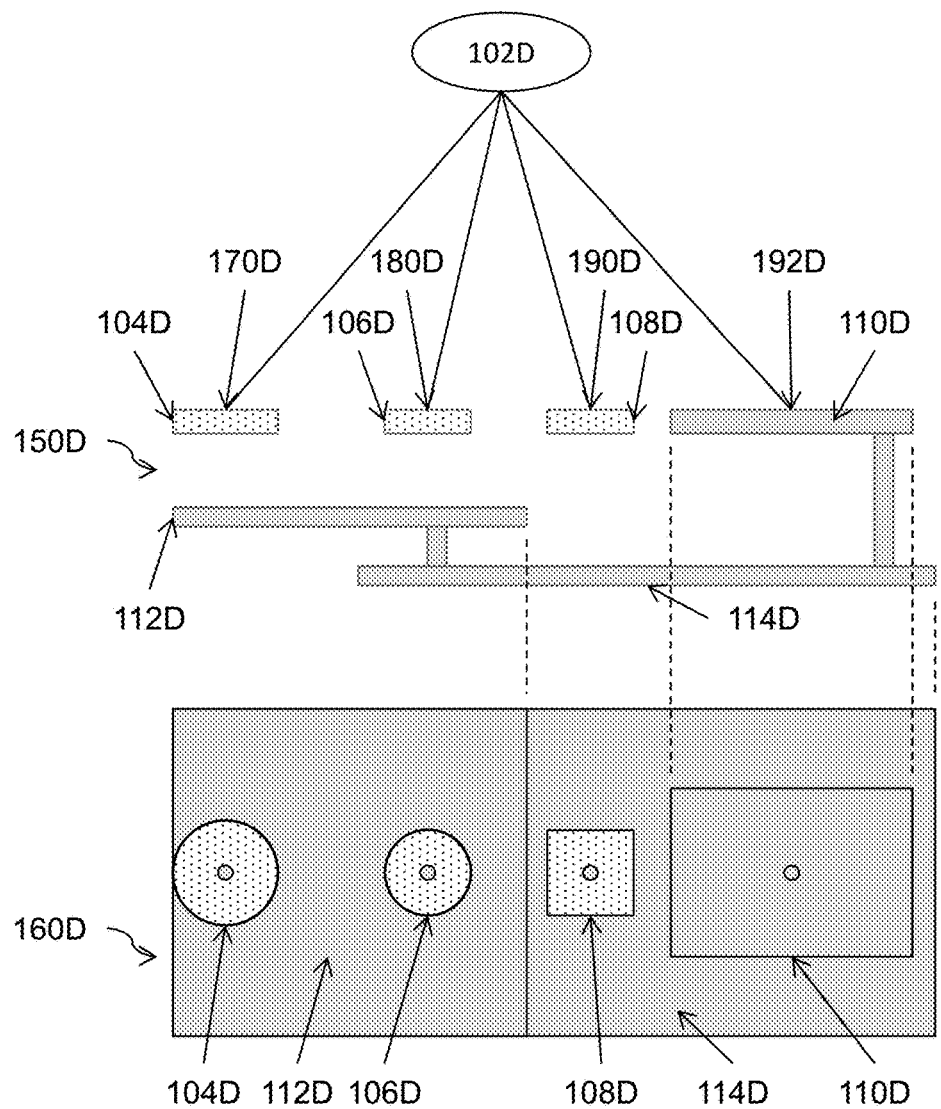
FIG. 1D illustrates another in-plane, side view and a top view of a simplified electronic design including parallel metal shapes that are interconnected to other ports or circuitry.

FIG. 1D illustrates another in-plane, side view and a top view of a simplified electronic design including parallel metal shapes that are interconnected to other ports or circuitry in one or more embodiments. The simplified electronic design includes two pairs of parallel metal shapes, the first pair including interconnected second metal shape 112D and third metal shape 114D, and the second pair including interconnected third metal shape 114D and first metal shape 110D in the in-plane, side view 150D. The simplified electronic design also includes three separate metal shapes 104D, 106D, and 108D that are used to connect the simplified electronic design to one or more linkage circuit elements 102D.

These one or more linkage circuit elements 102D may include, for example, ground plane, power plane, signal layer, etc. in some of these embodiments. FIG. 1D also includes the top view 160D which constitutes the orthogonally projected view of the simplified electronic design when viewed from the side of one or more linkage circuit elements 102D (not shown in the top view 160D). It shall be noted that although FIG. 1D shows three separate metal shapes (104D, 106D, and 108D) that appear to be floating in the top view, these separate metal shapes may be interconnected to the simplified electronic design.

It shall be further noted that these three separate shapes need not be separate from each other and may constitute a single metal shape or two separate shapes, rather than three separate metal shapes as illustrated in FIG. 1D. In addition, metal shapes 104D, 106D, and 108D are connected to the one or more linkage circuit elements 102D at three separate "nodes" 170D, 180D, 190D, and 192D. For example, metal shape 104D is connected to the one or more linkage circuit elements 102D at node 170D; metal shape 106D is connected to the one or more linkage circuit elements 102D at node 180D; metal shape 108D is connected to the one or more linkage circuit elements 102D at node 190D; and metal shape 110D is connected to the one or more linkage circuit elements 102D at node 192D. In other words, these four separate metal shapes 104D, 106D, 108D, and 110D are not connected to the one or more linkage circuit elements 102D by using vias.

In these embodiments illustrated in FIG. 1D, the interconnects between nodes have finite dimensions yet do not exist in parallel field domains and thus may cause difficulties or produce inaccurate results in analyzing or simulating the behavior of the simplified electronic design with a convention hybrid or 2.5D solver which models electronic circuits in 2D models. These difficulties and inaccurate results may occur regardless of where the boundary of the model is determined, and what kind of boundary conditions is imposed on the model because there will be current carrying interconnects (regardless of their lengths) protruding from the top surface of the four metal shapes (104D, 106D, 108D, and 110D) and situated outside any parallel field domains. Nonetheless, these difficulties and inaccurate results arising from conventional 2.5D or hybrid solvers can be mitigated or completely eliminated with the extruded via techniques described herein, especially the description for FIG. 1E presented immediately below.

Figure 1E:
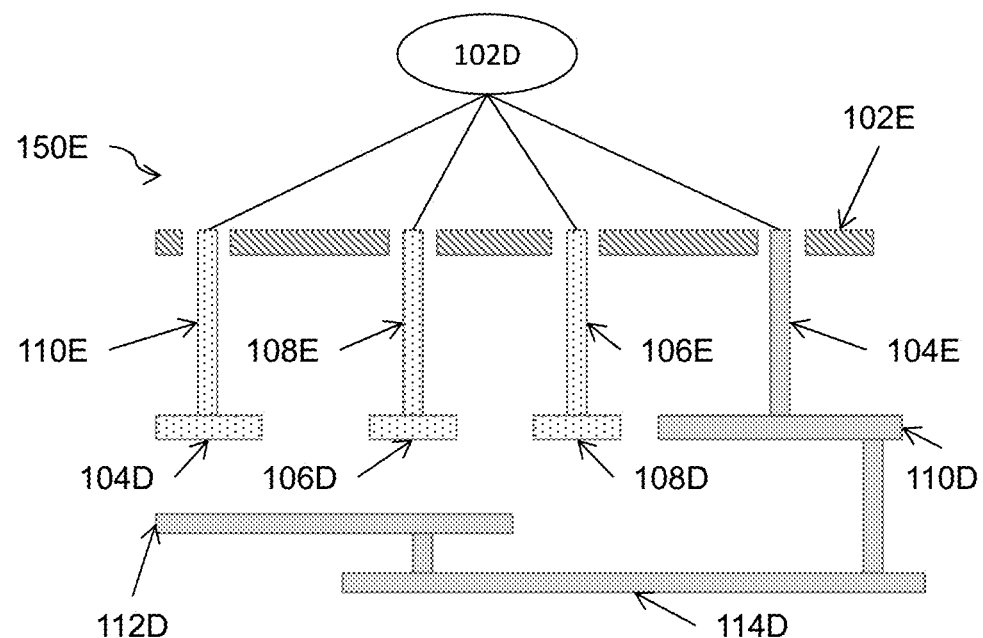
FIG. 1E illustrates an application of extruded via techniques to construct a model for electrical analyses or electromagnetic simulation of the simplified electronic design illustrated in FIG. 1D with a hybrid solver while accurately accommodating the behaviors of circuit components outside the parallel field domains in one or more embodiments.
Figure 1E:
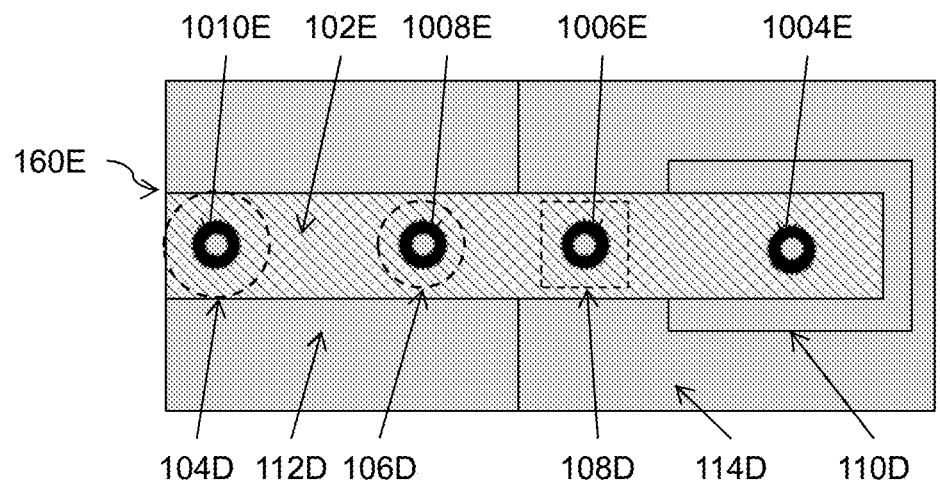

FIG. 1E illustrates an application of extruded via techniques to construct a model for electrical analyses or electromagnetic simulation of the simplified electronic design illustrated in FIG. 1D with a hybrid solver while accurately accommodating the behaviors of circuit components outside the parallel field domains in one or more embodiments. The location of a reference plane 102E may be determined in an identical or substantially similar manner as that described for the first reference plane 106C of FIG. 1C, and the reference plane 102E may be added to the model as represented by the in-plane, side view 150E in FIG. 1E.

In these embodiments, the connectivity information for interconnecting the simplified electronic design to the one or more linkage circuit elements 102D may be determined. For example, the connectivity mechanism 102 may determine that the simplified electronic design is interconnected to the one or more linkage circuit elements 102D at nodes 170D, 180D, 190D, and 192D. The connectivity information may then be used to determine where vias may be located. In this example illustrated in FIG. 1E, it may be determined that vias may be extruded from the nodes 170D, 180D, 190D, and 192D identified from the connectivity information.

Via extrusion techniques may then be performed to construct and extrude vias 104E, 106E, 108E, and 110E from these four nodes (170D, 180D, 190D, and 192D) to the added reference plane 102E. For example, a via 104E may be located at and extruded from node 192D; another via 106E may be located at and extruded from node 190D; another via 108E may be located at and extruded from node 180D; and the other via 110E may be located at and extruded from node 170D to the reference plane 102E. In some of these embodiments, these vias are extruded not to protrude from the top surface of the reference plane 102E so as not to create current carrying circuit components outside parallel field domains. With the extruded vias, connectivity may be re-established to connect each of the four extruded vias (104E, 106E, 108E, and 110E) to the one or more linkage circuit elements 102D.

A model for the simplified electronic design may thus be constructed to include the simplified electronic design (104D, 106D, 108D, 110D, 112D, 114D, and their interconnects), the extruded vias (104E, 106E, 108E, and 110E), and the reference plane 102E. In this model, all the current carrying circuit components are situated within some parallel field domains, and the electrical behavior of the simplified circuit may be accurately determined by using a hybrid or 2.5D solver, without using any 3D solvers, while producing equally or approximately accurate analysis or simulation results for the 3D model of the electronic circuit design. It shall be noted that view 150E represents an in-plane, side view of the simplified electronic design as well as the model that may be analyzed or simulated and eventually solved by using the 2.5D or hybrid solver.

Figure 3A:
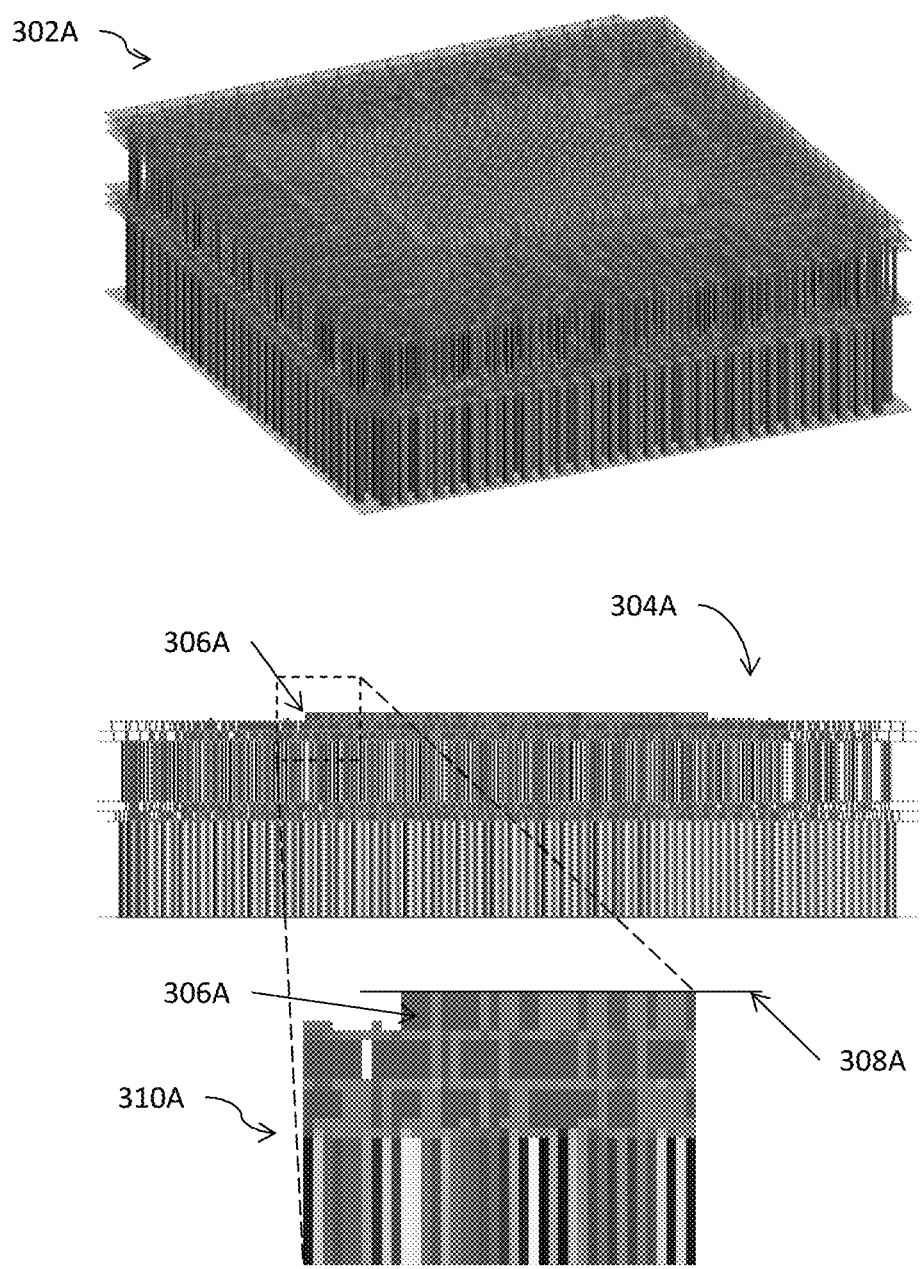
FIG. 3A illustrates a perspective view of an electronic design, an in-plane view of a constructed model of the electronic design for electrical analyses or electromagnetic simulation, and a zoom-in view of a portion of the constructed model in one or more embodiments.
Figure 3B:
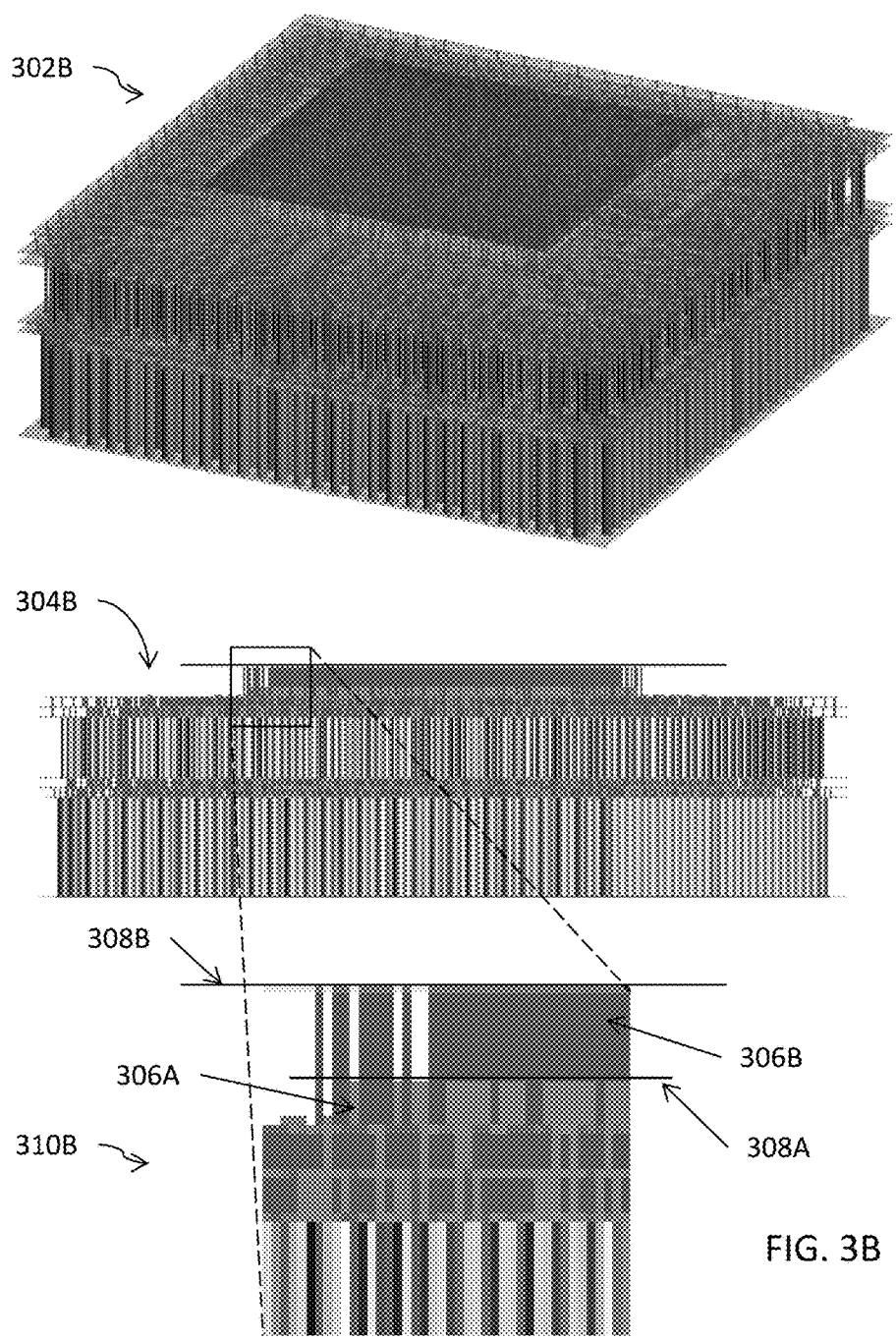
FIG. 3B illustrates the application of some extruded via techniques to the perspective view of the electronic design, the in-plane view of a constructed model of the electronic design for electrical analyses or electromagnetic simulation, and the zoom-in view of a portion of the constructed model illustrated in FIG. 3A in one or more embodiments.

The simplified circuit design itself may nevertheless be modeled in three-dimensional space as illustrated in FIGS. 3A-B. FIG. 1E also illustrates the top view 160E which constitutes the orthogonally projected view of the simplified electronic design when viewed from the side of the external circuitry or port(s) 102E (not shown in the top view 160E). The top view illustrates the reference plane 102E that may be determined in an identical or substantially similar manner as that for the first reference plane 106C in FIG. 1C. It shall be noted that the reference plane 102E is determined to and modeled to reduce, minimize, or completely eliminate undesirable disturbances to the original behavior of the electronic design, and the reference plane 102E is illustrated in FIG. 1E for the ease of illustration or explanation and may or may not necessarily accurately represent the actual shape of the reference plane 102E. The "via clearance" between the circumference of an extruded via and the reference plane 102E may be also determined in an identical or substantially similar manner as that for an anti-pad, which represents spacing between the extruded via and inner boundary of the structures. For example, the via clearance for the extruded via 110E may be determined based in part or in whole upon the capacitance and/or the impedance of the extruded via 110E.

Figure 2A:
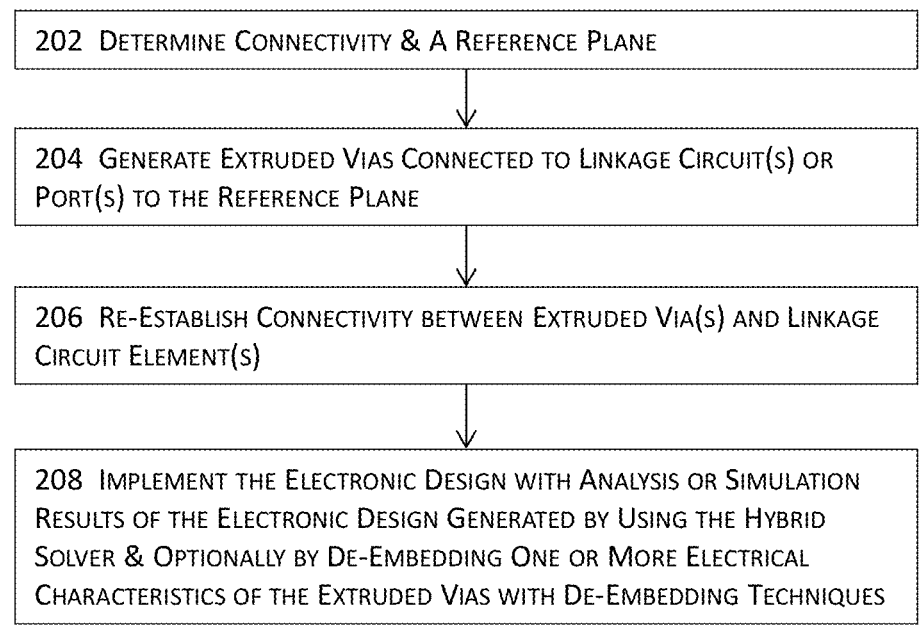
FIG. 2A illustrates a high-level block diagram for constructing a model for electrical analyses or electromagnetic simulation of an electronic design with a hybrid solver while accurately accommodating the behaviors of circuit components outside the parallel field domains in one or more embodiments.

FIG. 2A illustrates a high-level block diagram for constructing a model for electrical analyses or electromagnetic simulation of an electronic design with a hybrid solver while accurately accommodating the behaviors of circuit components outside the parallel field domains in one or more embodiments. In these one or more embodiments, connectivity information may be determined for an electronic design at 202. The connectivity information specifies how an electronic circuit design is connected to another electronic circuit design or a part thereof. For example, connectivity information may include information such as the identifications of the pins, pads, ports, or via locations to and/or from which an electronic design is connected to one or more linkage circuit elements such as reference numerals 110B of FIGS. 1B-C or 102D of FIGS. 1D-E.

In the example illustrated in FIGS. 1D-E, the connectivity information may include the identifications of the nodes 170D, 180D, 190D, 192D, and their respective ports or connections in 102D. A reference plane may also be determined at 202. A reference plane (e.g., reference plane 106C in FIG. 1C or 102E in FIG. 1E) may serve as a common reference (e.g., a common ground, etc.) for the currents to flow in the electronic circuit design of interest. Another purpose of a reference plane is that a reference plane may be devised and/or positioned in such a way that electromagnetic fields may be modeled as in-plane field domains between one or more pairs of parallel metal shapes. The in-plan parallel field domains may then be solved with a hybrid solver to provide sufficiently accurate analysis or simulation results for the electrical behavior of the electronic circuit design on interest, without using any 3D solvers.

Moreover, the reference plane may be added to the model for the electronic circuit design while encompassing the current carrying circuit component designs within the parallel field domains modeled by and eventually solved for by the hybrid or 2.5D solver. As presented earlier, it is difficult to model a current carrying circuit component outside any parallel field domains with a hybrid or 2.5D solver. By adding a reference plane to the model, current carrying circuit components will be encompassed within parallel field domain(s) and thus may be accurately modeled and solved for with a hybrid or 2.5D solver, without resorting to 3D solvers, while providing equally or approximately accurate simulation or analysis results as 3D solvers for the three-dimension model of the electronic circuit design.

A reference plane may include electrical and/or physical properties of a metal shape in some embodiments. In some other embodiments, a reference plane may be devised to have electrical and/or physical properties such that the reference plane, when modeled in the model for the electronic design, reduces, minimizes, or completely eliminates undesirable disturbances to the original behavior of the electronic design. In addition to reducing, minimizing, or eliminating disturbances to the original behavior of the electronic design of interest, a reference plane may also be modeled with some dimensions (e.g., length, width, and/or thickness) that may be determined based in part or in whole upon one or more criteria including, for example, maintaining numerical stability, reducing or minimizing undesirable disturbances to the original behavior of the electronic design, the ease of modeling, etc. For example, a reference plane may be modeled with some sufficiently small thickness value that does not cause numerical instability or difficulties (e.g., difficulties in meshing or mesh generation) or difficulties in modeling while keeping the disturbances to the original behavior of the electronic design in check.

The position of a reference plane may also be determined based in part or in whole upon one or more criteria. For example, the reference plane 102E in FIG. 1E may be positioned closer to metal shapes 104D, 106D, 108D, and 110D such that the extruded vias (104E, 106E, 108E, and 110E) have relatively short lengths in some embodiments. It shall be noted that by introducing a reference plane having the characteristics or properties of some metal, the introduction of the reference plane in a model for an electronic design may exhibit some influence over the original behavior of the electronic design due to the introduction of the reference plane and the artificial field domains involving the reference plane and other portions of the original electronic design.

Placing a reference plane closer to the metal plane underneath may cause larger eddy currents and hence greater reduction of the self-inductance for the signal path introduced by the addition of the reference plane. The other effect of placing a reference plane closer to the metal plane from which vias are extruded is the higher coupling capacitance between the reference plane and the metal plane. Higher capacitance may cause undesirable parasitic oscillation, especially in radio frequency designs, audio processing designs, electronic amplifier designs, digital signal processing designs, etc. For example, parasitic capacitances between the output and the input of an amplifier circuit may act as a feedback path causing the amplifier circuit to oscillate at a high frequency.

In some higher frequency designs, parasitic capacitances may also combine with stray inductance to form resonant circuits that lead to resonant circuits (e.g., self-resonant circuits). This larger coupling capacitance may be managed by the de-embedding flow that will be described in greater details below. In addition or in the alternative, the effects arising from the positioning of a reference plane may also be mitigated by modeling various components (e.g., the reference plane, the extruded vias, the artificial region created by the addition of the reference plane, etc.) with appropriate parameters or properties. In a de-embedding process, the resistance, inductance, and/or the capacitance of an extruded via may be excluded from the model for an electronic design in some embodiments. In addition or in the alternative, the medium for the artificial field domain or region created by the introduction of a reference may be modeled and adjusted to exclude one or more electrical characteristics introduced by an extruded via in the artificial region or field domain.

On the other hand, a reference plane may also be placed relatively far away from the metal shape from which one or more vias are extruded. Placing a reference plane far away from the metal shape results in a lower coupling capacitance between the reference plane and the metal shape. Nonetheless, the extruded vias will have longer lengths and hence exhibit higher inductances that may be undesirable for high frequency alternating current (AC) signals. High inductance also imposes stronger opposition to the change in the electric current from the Lenz's Law and is thus undesirable for power designs or other aspects such as thermal, reliability, etc. of electronic designs.

This higher inductance may also be managed by the de-embedding flow that will be described in greater details below. In some embodiments, a reference plane may be determined at a location that exhibits a relatively low coupling capacitance while using the de-embedding flow to manage the inductance to reduce, minimize, or eliminate disturbances to the original behavior of the electronic design. In other embodiments, a reference plane may be determined at a location that exhibits a relatively low inductance while using the de-embedding flow to manage the coupling capacitance to reduce, minimize, or eliminate disturbances to the original behavior of the electronic design.

In yet some other embodiments, a reference plane may be determined at a location while using the de-embedding flow to manage both the inductance and the coupling capacitance to reduce, minimize, or eliminate disturbances to the original behavior of the electronic design. In some embodiments, the model includes an artificial region that is situated between the reference plane and the metal shape(s) from which one or more vias are extruded. This artificial region is not a part of the original electronic design and may be modeled with a medium having a relative low inductance, a relative low capacitance, and/or a relative low resistivity based in part or in whole upon one or more criteria. For example, the inductance, capacitance, and/or resistivity may be modeled for this medium of an artificial region to reduce, minimize, or eliminate disturbances to the original behavior of the electronic design. That is, one or more electrical properties for this medium of the artificial region may be modeled with some low values (e.g., close to zero) that do not disturb numerical stability during the analyses or simulations while exhibiting reduced or negligible effects on the original behavior of the electronic circuit design.

At 204, one or more vias may be generated and extruded to the reference plane by using the connectivity information. In some embodiments, an existing via may be prolonged at 204 to the reference plane introduced to the model at 202. In some other embodiments, a new via may be generated and extruded at 202 to the reference plane. An extruded via may be modeled with a length and a diameter in the model for the electronic design. The extruded length of an extruded via may be determined as the length from the node of extrusion to the bottom of the reference plane, the top of the reference plane, or anywhere between the top and the bottom surfaces.

The overall length of an extruded via may then be determined as the extruded length plus the length of the existing via (if existing). The node of extrusion for an extruded via is the point where the electronic circuit design is connected to the corresponding linkage circuit element and may be determined from the connectivity information. If the electronic circuit design is connected to a linkage circuit element with an existing via, the node for the corresponding extruded via may be determined to be a point (e.g., the center point) on the top of the existing via. If the electronic circuit design is connected to a linkage circuit element without using an existing via, the node for the corresponding extruded via may be determined to be the point at which the electronic circuit design is connected to the linkage circuit element.

The diameter of an extruded via may be determined to be any number in some embodiments. In these embodiments, any side effects introduced by the extruded via may be reduced, minimized, or eliminated by the de-embedding process. In some embodiments where the extruded via is extruded from an existing via, the diameter or cross-section profile may or may not be the same as that of the existing via although modeling the extruded portion with the same diameter or cross-section profile may be easier for modeling and/or analyses of the electronic circuit design. In some embodiments, the diameter or cross-section profile of an extruded via may include a default or predetermined or a randomly selected value or profile.

In these embodiments, the side effects introduced by the extruded portion of a via may be reduced, minimized, or eliminated by the de-embedding process and/or by the selection of appropriate electrical properties of various circuit components (e.g., the reference plane, the via, etc.) An extruded via may also be modeled with one or more actual electrical properties of a metallic material in some embodiments or one or more artificial electrical properties in some other embodiments. For example, an extruded via may inherit one or more actual electrical properties (e.g., capacitance, resistance, and/or inductance) of a metal shape (e.g., the metal shape from which the extruded via is extruded) or an existing via that is to be further extruded to a reference plane.

As another example, an extruded via may be modeled to include zero capacitance, zero resistance, and/or low inductance. In this latter example, an extruded via may be modeled to have a low inductance whose influence over the original electrical behavior of the electronic circuit design, but the low inductance does not have an overly small value so as to cause numerical instability in modeling and/or solving the electronic circuit design with the constructed model including the extruded via.

At 206, connectivity of the electronic circuit design with one or more extruded vias to one or more linkage circuit elements may be re-established. In the example illustrated in FIGS. 1D-E, an extruded via 110E is extruded from node 170D off the metal shape 104D. The metal shape 104D was originally connected to a linkage circuit element 102D at node 170D. This interconnection between the metal shape 104D and the one or more linkage element 102D is removed to accommodate via extrusion. With the extruded via 110E illustrated in FIG. 1E, connectivity between the metal shape 104D and the one or more linkage circuit elements 102D may be re-established by connecting the extruded via 110E to the one or more linkage circuit elements 102D.

Re-establishing the connectivity may be performed by updating the connectivity information with the extruded via. The electronic circuit design may then be analyzed or simulated and further implemented using the analysis or simulation results at 208 with the constructed analysis model that includes the one or more extruded vias and reference plane. In some embodiments, de-embedding techniques may be applied to the analysis model to de-embed one or more electrical characteristics (e.g., inductance, capacitance, etc.) caused by the added reference plane and/or one or more extruded vias. With the added reference plane and one or more extruded vias, circuit component designs will be situated within parallel field domains, and the model may thus be solved with a hybrid or 2.5D design, without using any 3D solvers.

In addition to a tremendous amount of saving in the memory footprint and computation resources used for analyses or simulations of the electrical behavior of electronic circuit designs, one of the advantages of the techniques described in this application is that with the added reference plane, nodes in an electronic circuit design no longer lack a common reference, and finding current return paths may thus be performed more accurately and less complex because the exclusion of circuit component designs outside parallel field domains leads to more accurate determination and extraction of electrical properties and characteristics. Another advantage is that the constructed model with the added reference plane and extruded vias provides a more stable and accurate model that is less sensitive to numerical stability (e.g., a small change resulting in a relatively large fluctuation in the electrical properties and/or characteristics) due to the reduction or elimination of current circuit components (e.g., electric current carrying circuit components) outside parallel field domains.

Figure 2B:
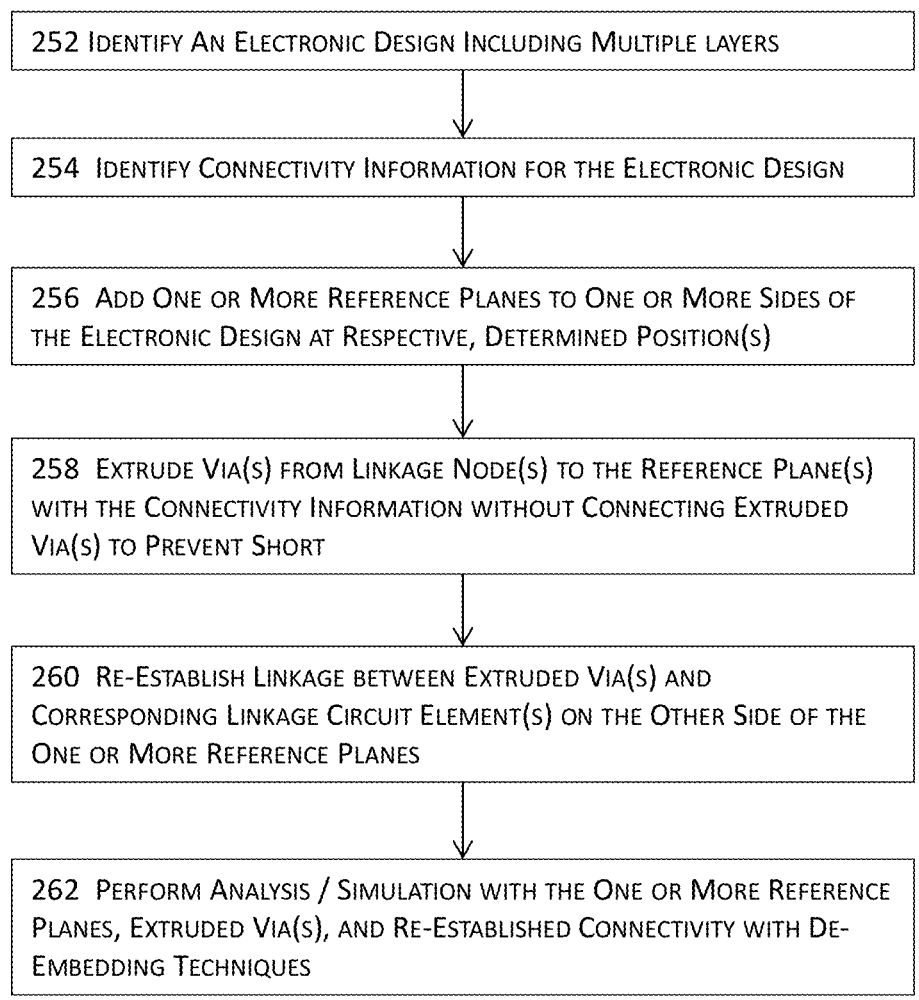
FIG. 2B illustrates another block diagram for constructing a model for electrical analyses or electromagnetic simulation of an electronic design with a hybrid solver while accurately accommodating the behaviors of circuit components outside the parallel field domains in one or more embodiments.

FIG. 2B illustrates another block diagram for constructing a model for electrical analyses or electromagnetic simulation of an electronic design with a hybrid solver while accurately accommodating the behaviors of circuit components outside the parallel field domains in one or more embodiments. An electronic design or a portion thereof including multiple layers may be identified at 252, where these multiple layers include, for example, one or more metal layers in an integrated circuit design, one or more printed circuit board or PCB layers, or any combinations thereof. Connectivity information for the electronic design or the portion thereof may be identified at 254.

The connectivity information may include information such as the identifications of the pins, pads, ports, or via locations to and/or from which an electronic design is connected to some external circuitry or one or more external ports such as reference numerals 110B of FIGS. 1B-C or 102D of FIGS. In addition or in the alternative, the connectivity information may include the nets, net segments, or traces interconnecting the portion of the electronic circuit design and the one or more linkage circuit elements, and these nets, net segments, or traces may be annotated or associated with the connection identifications to indicate which circuit components these nets, net segments, or traces are interconnecting. One or more reference planes may be determined and added to one or more sides of the electronic design or the portion thereof at 256 to reduce or eliminate the number of conductors outside parallel field domains.

It shall be noted that one of the purposes of introducing a reference plane into a model for an electronic design is to encompass conductors that are at least partially outside parallel field domains. In the examples illustrated in FIGS. 1B-E, only one reference plane is added to each of the examples. Nonetheless, the number as well as the positions of reference planes to be added to a model depends on the configuration of the electronic design, for which the model is constructed. In some embodiments, a model may include more than one reference plane for an electronic design so that the total number of conductors outside parallel field domains may be reduced or completely eliminated.

One or more vias may be extruded at 258 from the corresponding one or more linkage nodes (e.g., 170D, 180D, 190D, or 192D in FIG. 1D) to the one or more reference planes determined at 256. An extruded via is extruded to the reference plane without physically and hence electrically being connected to the reference plane. Rather, a via clearance akin to an anti-pad is determined and created with a certain size in the model to clear the extruded via. Linkage or connectivity may be re-established at 260 between the one or more extruded vias and the one or more corresponding linkage circuit elements that are located on the other side of the added reference plane.

One or more analyses or simulations may be performed at 262 with the model that includes the model in the two-dimensional space, the one or more reference planes, the one or more extruded vias, and the re-established connectivity. In some embodiments, de-embedding techniques may be used to reduce, minimize, or eliminate the effects (e.g., resistance inductance, and/or capacitance) caused by the introduction of the reference plane and/or the extruded vias on the electrical behavior of the electronic circuit.

Figure 2C:
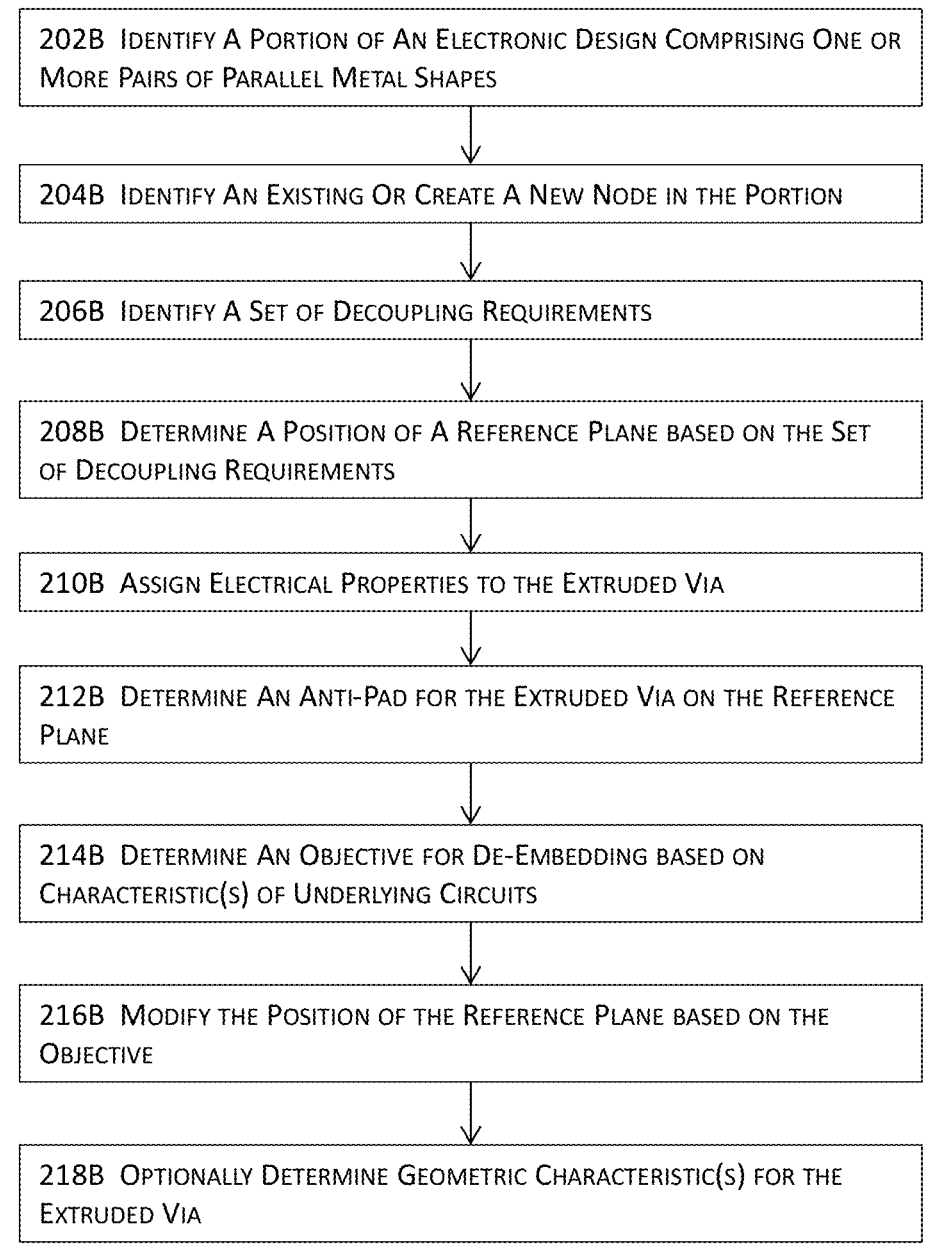
FIGS. 2C-D jointly illustrate a more detailed block diagram for constructing a model for electrical analyses or electromagnetic simulation of an electronic design with a hybrid solver while accurately accommodating the behaviors of circuit components outside the parallel field domains in one or more embodiments.
Figure 2D:
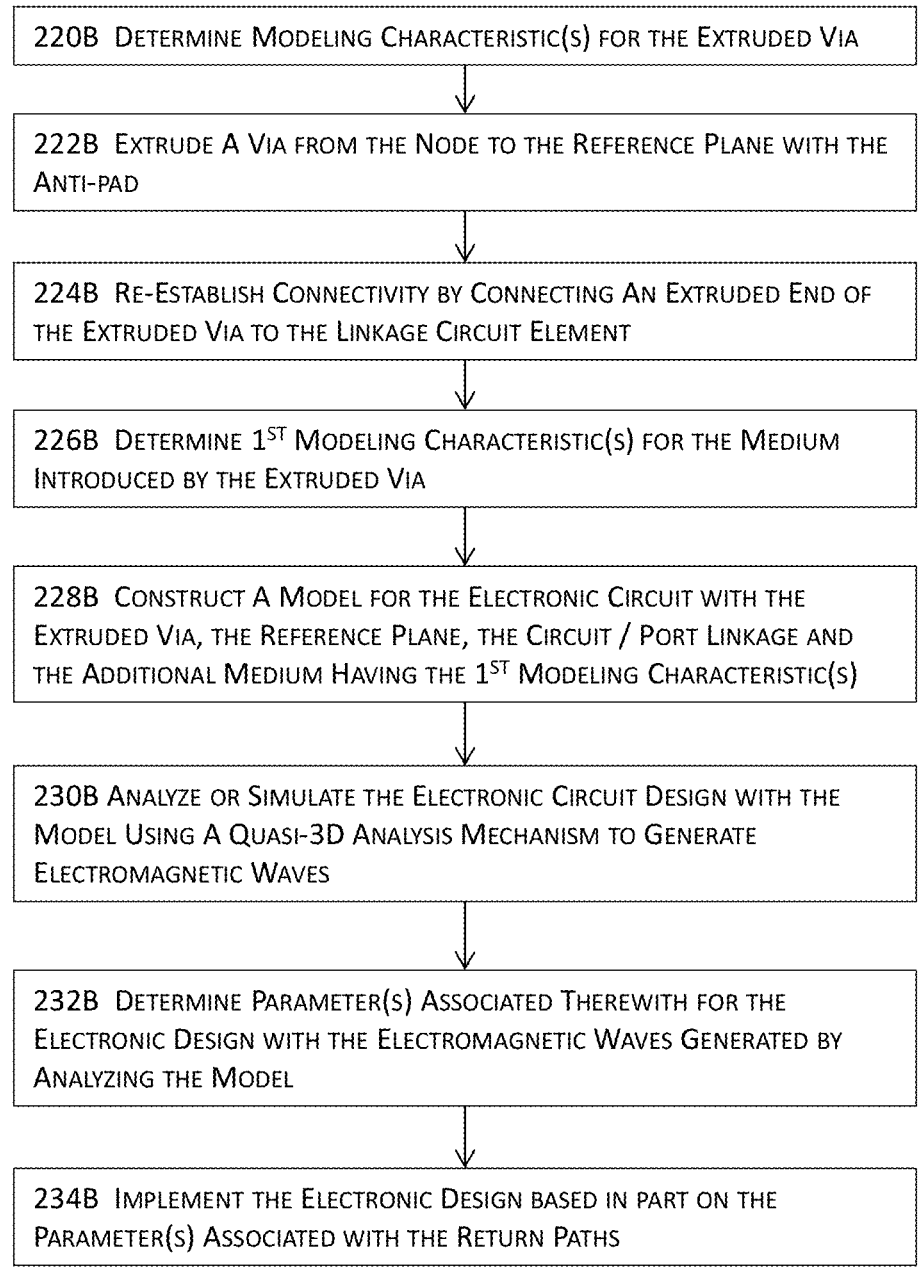

FIGS. 2C-D jointly illustrate a more detailed block diagram for constructing a model for electrical analyses or electromagnetic simulation of an electronic design with a hybrid solver while accurately accommodating the behaviors of circuit components outside the parallel field domains in one or more embodiments. A portion of an electronic design that comprises one or more pairs of parallel metal shapes may be identified at 202B. At 204B, an existing node or a new node may be identified in the portion. In some embodiments, a node or a connectivity node includes a point or circuit component at which the portion of the electronic circuit design is connected to a linkage circuit element.

A node may be identified by referencing the connectivity information which includes the identifications (e.g., names) of the connections (e.g., pins, pads, ports, vias, etc.) of the portion and the identifications of the corresponding connections in one or more linkage circuit elements (e.g., external circuitry or ports). In addition or in the alternative, the connectivity information may include the nets, net segments, or traces interconnecting the portion of the electronic circuit design and the one or more linkage circuit elements, and these nets, net segments, or traces may be annotated or associated with the connection identifications to indicate which circuit components these nets, net segments, or traces are interconnecting.

A set of decoupling requirements may be identified at 206B. The set of decoupling requirements may include, for example, reducing or minimizing capacitance, reducing or minimizing inductance, or a combination thereof. For example, for an RF design, an audio processing design, an amplifier design, a high frequency design, or a signal processing design, higher capacitance is known to cause undesirable parasitic oscillations. In this example, the set of decoupling requirements may include a requirement to reduce or minimize coupling capacitance. This set of decoupling requirements may be done with or without accommodating the effects on inductances. As another example, for an electronic design with an emphasis on power requirements, thermal behavior, or reliability, the set of decoupling requirements may include a requirement to reduce or minimize inductance values to reduce or minimize the effective resistance of conductors.

To reduce or eliminate the number of conductors outside any parallel field domains, a position of a reference plane may be determined at 208B. The position of a reference plane may be determined to reduce or eliminate conductors outside any parallel field domains. For an in-plane model of an electronic circuit design to be analyzed, solved, or simulated with a hybrid or 2.5D solver, it may be first determined which side a reference plane may be added to accomplish the objective of reducing or eliminating conductors outside parallel field domains. Once the side is determined, the actual position of a reference plane may be determined while accommodating extruded vias.

The position of a reference plane may be determined based in part or in whole upon the set of decoupling requirements. For example, a reference plane may be placed closer to the metal shape from which one or more vias are extruded to reduce the lengths of these one or more extruded vias in order to reduce inductance in some embodiments. As another example, a reference plane may be placed as far away from the metal shape from which one or more vias are extruded to reduce or minimize coupling capacitance. As another example, a reference plane may be placed to account for both the coupling capacitance concerns and the inductance concerns. As presented earlier, placing a reference plane closer to the metal plane underneath may cause larger eddy currents and hence greater reduction of the self-inductance for the signal path introduced by the addition of the reference plane.

Another effect of placing a reference plane closer to the metal plane from which vias are extruded is the higher coupling capacitance between the reference plane and the metal plane. Higher capacitance may cause undesirable parasitic oscillation, especially in radio frequency designs, audio processing designs, electronic amplifier designs, digital signal processing designs, etc. For example, parasitic capacitances between the output and the input of an amplifier circuit may act as a feedback path causing the amplifier circuit to oscillate at a high frequency. In some higher frequency designs, parasitic capacitances may also combine with stray inductance to form resonant circuits that lead to resonant circuits (e.g., self-resonant circuits).

This larger coupling capacitance may be managed by the de-embedding flow that will be described in greater details below. On the other hand, a reference plane may also be placed relatively far away from the metal shape from which one or more vias are extruded. Placing a reference plane far away from the metal shape results in a lower coupling capacitance between the reference plane and the metal shape. Nonetheless, the extruded vias will have longer lengths and hence exhibit higher inductances that may be undesirable for high frequency alternating current (AC) signals. High inductance also imposes stronger opposition to the change in the electric current from the Lenz's Law and is thus undesirable for power designs or other aspects such as thermal, reliability, etc. of electronic designs.

This higher inductance may also be managed by the de-embedding flow that will be described in greater details below. In some embodiments, a reference plane may be determined at a location that exhibits a relatively low coupling capacitance while using the de-embedding flow to manage the inductance to reduce, minimize, or eliminate disturbances to the original behavior of the electronic design. In other embodiments, a reference plane may be determined at a location that exhibits a relatively low inductance while using the de-embedding flow to manage the coupling capacitance to reduce, minimize, or eliminate disturbances to the original behavior of the electronic design. In yet some other embodiments, a reference plane may be determined at a location while using the de-embedding flow to manage both the inductance and the coupling capacitance to reduce, minimize, or eliminate disturbances to the original behavior of the electronic design.

At 210B, one or more electrical properties may be assigned to extruded vias. For example, an extruded via may inherit one or more actual electrical properties (e.g., capacitance, resistance, and/or inductance) of a metal shape (e.g., the metal shape from which the extruded via is extruded) or an existing via that is to be further extruded to a reference plane. As another example, an extruded via may be modeled to include one or more artificial values including zero capacitance, zero resistance, and/or low inductance. It shall be noted that a model constructed pursuant to the techniques described herein may or may not necessarily have the same electrical properties.

Via clearances on the reference plane may be determined at 212B so that the electronic design may be re-connected to the one or more linkage elements after introducing the reference plane and one or more extruded vias into the model. A via clearance may be determined in an identical or substantially similar manner as that for an anti-pad, which represents spacing between an extruded via and the boundary of the corresponding aperture in the reference plane in some embodiments. An objective for de-embedding may be optionally identified or determined at 214B based in part or in whole upon one or more characteristics of the underlying electronic circuit design. In some embodiments, an objective may include removing or reducing the additional capacitance caused by the introduction of a reference plane, removing or reducing the inductances caused by the introduction of an extruded via, or removing both the additional capacitance caused by the introduction of a reference plane and removing or reducing the inductances caused by the introduction of an extruded via.

A de-embedding process may be used to reduce, minimize, or eliminate the effects (e.g., resistance inductance, and/or capacitance) caused by the introduction of the reference plane and/or the extruded vias on the electrical behavior of the electronic circuit. An objective may include, for example, a first objective to reduce, minimize, or eliminate coupling capacitances introduced by the addition of a reference or one or more extruded vias, a second objective to reduce, minimize, or eliminate inductance introduced by the addition of a reference or one or more extruded vias, or any combinations thereof, etc. The one or more characteristics may include the application, an intended purpose, the type, etc. of the electronic circuit design.

For example, the second objective listed above may be identified for an electronic circuit design with an emphasis on power, reliability, or thermal stability, etc. As another example, the first objective listed above may be identified at 214B for an electronic circuit design (e.g., radio frequency designs, audio processing designs, electronic amplifier designs, digital signal processing designs, etc.) that is more susceptible to parasitic oscillations. At 216B, the position of the reference plane may be optionally modified at 216B based in part or in whole upon the objective identified or determined at 214B. At 218B, the geometric characteristics of an extruded via may be optionally determined. The geometric characteristics may include the diameter, the cross-section shape or size, and/or the length of a via.

As described previously, the diameter or cross-section profile may or may not be the same as that of the existing via in some embodiments where the extruded via is extruded from an existing via although modeling the extruded portion with the same diameter or cross-section profile may be easier for modeling and/or analyses of the electronic circuit design. In some embodiments, the diameter or cross-section profile of an extruded via may include a default or predetermined or a randomly selected value or profile. In these embodiments, the side effects introduced by the extruded portion of a via may be reduced, minimized, or eliminated by the de-embedding process and/or by the selection of appropriate electrical properties of various circuit components (e.g., the reference plane, the via, etc.)

One or more modeling characteristics may be determined for the extruded via at 220B. For example, one or more electrical and/or physical properties or characteristics may be identified at 220B. It shall be noted that the extruded portion of a via constitutes a factitious via portion in the electronic design because the actual electronic design does not include such an extruded portion. As a results, the one or more modeling characteristics (e.g., capacitance, resistivity, inductance, one or more other physical properties, etc.) may be determined to minimize the artificial effects introduced by the addition of an extruded via into an electronic circuit design.

In some of these embodiments, an extruded portion of a via may be modeled with zero capacitance, zero resistivity, and low inductance. These one or more modeling characteristics may also include the characteristics of one or more other components that may interact with an extruded via. For example, the electrical and/or physical properties of the reference plane to which an extruded via is extruded, the electrical and/or physical properties of the medium of the artificial region encompassing the extruded via, etc. may also be determined at 220B. At 2228, a via may be extruded from a node to the reference plane. A via may be extruded to the bottom surface, the top surface, or any surface in between the top surface and the bottom surface of the reference plane.

In some embodiments, the extruded portion of a via may be extruded so that the extruded via does not protrude beyond the top surface (or bottom surface, depending on the positioning of the reference plane) of the reference plane to avoid creating another portion of the via outside parallel field domains. Connectivity may be re-established at 224B by connecting the extruded via to the corresponding linkage circuit element. At 226B, one or more first modeling characteristics for the medium of a factitious or artificial region created by the introduction of the reference plane may be determined. These one or more first modeling characteristics may include the capacitance, the resistivity, and/or the inductance of the medium in some embodiments.

In some of these embodiments, the medium may be modeled with low capacitance and/or low inductance to reduce the artificial effects caused by the reference plane and/or extruded vias while maintaining numerical stability. A model may then be constructed at 228B including the electronic circuit design, the reference plane, one or more extruded vias, and the medium. At 230B, the electronic design may be analyzed or simulated by using a hybrid or 2.5D solver and the model constructed at 228B to generate electromagnetic wave responses for the electrical behavior of the electronic circuit design. One or more parameters associated therewith may be determined at 232B with the analysis or simulation results obtained from 230B. In some embodiments, a return path for an extruded via is automatically determined with the added reference plane.

In some embodiments, the one or more parameters may include, for example, EMI current (electromagnetic interference current), RFI current (radio frequency interference current), transfer voltage, shielding requirement parameters, transfer parameters (e.g., transfer impedance, etc.), scattering parameters (s-parameters), Z-parameters, H-parameters, ABCD-parameters, s-parameter models, push/pull currents from return paths, or any combinations thereof, etc. At 234B, the electronic design may be implemented, created, or modified based in part or in whole upon the one or more parameters and/or the one or more return paths determined at 232B.

FIG. 3A illustrates a perspective view of an electronic design, an in-plane view of a constructed model of the electronic design for electrical analyses or electromagnetic simulation, and a zoom-in view of a portion of the constructed model in one or more embodiments. More specifically, FIG. 3A illustrates a perspective view 302A of a three-dimensional model of an electronic circuit design and a side view 304A of the electronic circuit design. FIG. 3A further illustrates a zoom-in view 310A of a smaller portion of the side view 304A. In the side view 304A, the electronic design includes a plurality of existing vias 306A that are also illustrated in the zoom-in view 310A. This zoom-in view 310A further illustrates a plane (in a three-dimensional space) or a line segment (in a two-dimensional space) 308A on which the linkage nodes for the plurality of vias 306A are located. That is, the plurality of vias 306A may be connected to some linkage circuit elements (not shown) at these linkage nodes located on the plane or line segment (depending on the dimensionality of the electronic circuit model) 308A.

FIG. 3B illustrates the application of some extruded via techniques to the perspective view of the electronic design, the in-plane view of a constructed model of the electronic design for electrical analyses or electromagnetic simulation, and the zoom-in view of a portion of the constructed model illustrated in FIG. 3A in one or more embodiments. More specifically, FIG. 3B illustrates a perspective view 302B of a three-dimensional model of the electronic circuit design illustrated in FIG. 3A and a side view 304B of the electronic circuit design. FIG. 3B further illustrates a zoom-in view 310B of a smaller portion of the side view 304B.

The zoom-in view 310B illustrates a plurality of existing vias 306A and the plane (in a three-dimensional space) or a line segment (in a two-dimensional space) 308A on which the linkage nodes for the plurality of vias 306A are located. The zoom-in view 310B further illustrates a reference plane (in a three-dimensional space) or a reference line segment (in a two-dimensional space) 308B that is added to a model to be solved by a hybrid or 2.5D solver. As FIG. 3B shows, the plurality of vias 306A are extruded to the reference plane 308B as illustrated by the extruded portion 306B in the zoom-in view 310B. The connectivity between the plurality of vias 306A in FIG. 3A may be re-established to connect the plurality of extruded vias including the extruded portion 306B to corresponding linkage circuit elements (now shown).

System Architecture Overview

Figure 4:
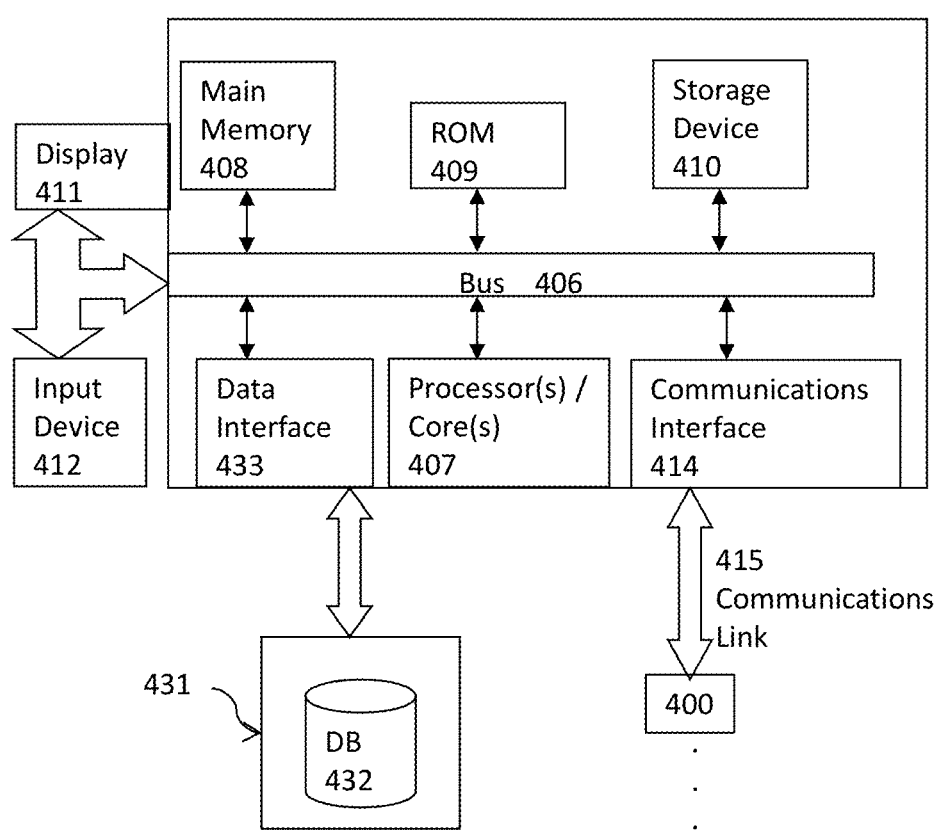

FIG. 4 illustrates a block diagram of an illustrative computing system 400 suitable for constructing a simulation schematic of an electronic design across multiple design fabrics as described in the preceding paragraphs with reference to various figures. Computer system 400 includes a bus 406 or other communication mechanism for communicating information, which interconnects subsystems and devices, such as processor 407, system memory 408 (e.g., RAM), static storage device 409 (e.g., ROM), disk drive 410 (e.g., magnetic or optical), communication interface 414 (e.g., modem or Ethernet card), display 411 (e.g., CRT or LCD), input device 412 (e.g., keyboard), and cursor control (not shown).

According to one embodiment, computing system 400 performs specific operations by one or more processor or processor cores 407 executing one or more sequences of one or more instructions contained in system memory 408. Such instructions may be read into system memory 408 from another computer readable/usable storage medium, such as static storage device 409 or disk drive 410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 407, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A mechanisms described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a mechanism described herein may be implemented as an application-specific integrated circuit (ASIC) in some embodiments.

In these embodiments, a mechanism may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of mechanism. A mechanism described herein or an equivalent thereof may perform its respective functions alone or in conjunction with one or more other mechanisms. A mechanism described herein or an equivalent thereof may thus invoke one or more other mechanisms by, for example, issuing one or more commands or function calls. The invocation of one or more other mechanisms may be fully automated or may involve one or more user inputs.

The term "computer readable storage medium" or "computer usable storage medium" as used herein refers to any non-transitory medium that participates in providing instructions to processor 407 for execution. Such a medium may take many forms, including but not limited to, non-volatile media and volatile media. Non-volatile media includes, for example, optical or magnetic disks, such as disk drive 410. Volatile media includes dynamic memory, such as system memory 408. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 400. According to other embodiments of the invention, two or more computer systems 400 coupled by communication link 415 (e.g., LAN, PTSN, or wireless network) may perform the sequence of instructions required to practice the invention in coordination with one another.

Computer system 400 may transmit and receive messages, data, and instructions, including program, i.e., application code, through communication link 415 and communication interface 414. Received program code may be executed by processor 407 as it is received, and/or stored in disk drive 410, or other non-volatile storage for later execution. In an embodiment, the computing system 400 operates in conjunction with a data storage system 431, e.g., a data storage system 431 that include a database 432 that is readily accessible by the computing system 400. The computing system 400 communicates with the data storage system 431 through a data interface 433. A data interface 433, which is coupled with the bus 406, transmits and receives electrical, electromagnetic or optical signals that include data streams representing various types of signal information, e.g., instructions, messages and data. In embodiments of the invention, the functions of the data interface 433 may be performed by the communication interface 414.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for model-based electronic design implementation with a hybrid solver, comprising:
    extruding an extruded via from a linkage node to a reference metal plane that is added to an analysis model for at least a portion of an electronic design;
    generating the analysis model for analyzing, in a three-dimensional space, the at least the portion of the electronic design at least by re-establishing interconnection between the at least the portion of the electronic design and a linkage circuit element with the extruded via;
    generating analysis or simulation results in the three-dimensional space at least by executing a hybrid solver module coupled with at least one microprocessor of a computing system on the analysis model, without requiring three-dimensional solver modules; and
    implementing the at least the portion of the electronic design using the analysis or simulation results.

2. The computer implemented method of claim 1, wherein the analysis or simulation results are generated for a three-dimensional model of the electronic design without using three-dimensional solvers.

3. The computer implemented method of claim 1, further comprising:
    Identifying connectivity information;
    generating the analysis or simulation results by using the hybrid solver to solve for electrical behavior of the at least the portion of the electronic design;
    storing the analysis or simulation results in a non-transitory computer memory; and
    retrieving at least a portion of the analysis or simulation results from the non-transitory computer memory with the electronic design implementation mechanism to implement the at least the portion of the electronic design based in part or in whole upon the at least the portion of the analysis or simulation results.

4. The computer implemented method of claim 1, further comprising:
    identifying one or more decoupling requirements;
    determining a position in the analysis model for the reference metal plane based in part or in whole upon the one or more decoupling requirements; and
    adding the reference metal plane at the position in the analysis model.

5. The computer implemented method of claim 4, wherein the one or more decoupling requirements include reducing or minimizing capacitances, reducing or minimizing inductances, or reducing the capacitances and inductances.

6. The computer implemented method of claim 1, further comprising:
    assigning one or more electrical properties to the extruded via, where the one or more electrical properties are determined from a metal shape in the at least the portion of the electronic design or from a set of artificial values.

7. The computer implemented method of claim 1, further comprising:
    de-embedding a modeling characteristic for the extruded via based in part or in whole upon a one or more de-embedding objectives, wherein the modeling characteristic includes an electrical properties or a physical property for the extruded via.

8. The computer implemented method of claim 7, further comprising:
    identifying one or more de-embedding objectives based in part or in whole upon one or more electrical characteristics of the at least the portion of the electronic design, the reference metal plane, and the extruded via; and
    determining one or more modeling characteristics for the extruded via, wherein the one or more modeling characteristics include at least one of one or more electrical properties, one or more physical properties, or a combination of at least one electrical property and at least one physical property for the extruded via.

9. The computer implemented method of claim 1, further comprising:
    removing a part of connectivity information between the linkage node and a linkage circuit element;
    updating the part of the connectivity information by re-establishing interconnection between at least the extruded via and the linkage circuit element; and
    storing the connectivity information, which has been updated, in a non-transitory computer memory.

10. The computer implemented method of claim 1, further comprising:
constructing the analysis model for the at least the portion of the electronic design at least by including the reference metal plane and the extruded via in the analysis model; and
forwarding the analysis model to the hybrid solver as an input model for the hybrid solver to determine electrical behavior of the at least the portion of the electronic design and to include the electrical behavior in the analysis or simulation results.

11. The computer implemented method of claim 10, further comprising at least one of:
analyzing or simulating the at least the portion of the electronic design by using the hybrid solver on the analysis model to determine the electrical behavior of the at least the portion of the electronic design; or
determining one or more return paths or one or more electrical parameters for the at least the portion of the electronic design.

12. The computer implemented method of claim 1, further comprising:
determining a first position in the analysis model for a first reference metal plane based in part or in whole upon one or more decoupling requirements; and
adding the first reference metal plane at the first position in the analysis model.

13. The computer implemented method of claim 1, further comprising at least one of:
determining a via clearance for one or more extruded vias including the extruded via;
modeling a medium for an artificial region created by the reference metal plane with one or more artificial properties; and
adjusting at least one artificial property of the one or more artificial properties of the medium for the artificial region.

14. A system for model-based electronic design implementation with a hybrid solver, comprising:
one or more mechanisms, at least one of which comprises at least one microprocessor including one or more processor cores executing one or more threads in a computing system;
a non-transitory computer accessible storage medium storing thereupon program code that includes a sequence of instructions that, when executed by the at least one microprocessor or processor core of a computing system, causes the at least one microprocessor or processor core at least to:
extrude an extruded via from a linkage node to a reference metal plane that is added to an analysis model for at least a portion of an electronic design;
generate the analysis model for analyzing, in a three-dimensional space, the at least the portion of the electronic design by re-establishing interconnection between the at least the portion of the electronic design and a linkage circuit element with the extruded via;
generate analysis or simulation results in the three-dimensional space at least by executing a hybrid solver module coupled with at least one microprocessor of a computing system on the analysis model, without requiring three-dimensional solver modules; and
implement the at least the portion of the electronic design using the analysis or simulation results.

15. The system of claim 14, wherein the program code includes further instructions that, when executed by the at least one microprocessor or processor core, cause the at least one microprocessor or processor core to:
identify one or more decoupling requirements;
determine a position in the analysis model for the reference metal plane based in part or in whole upon the one or more decoupling requirements; and
add the reference metal plane at the position in the analysis model.

16. The system of claim 14, wherein the program code includes further instructions that, when executed by the at least one microprocessor or processor core, cause the at least one microprocessor or processor core to:
de-embed a modeling characteristic for the extruded via based in part or in whole upon a one or more de-embedding objectives, wherein the modeling characteristic includes an electrical properties or a physical property for the extruded via.

17. The system of claim 14, wherein the program code includes further instructions that, when executed by the at least one microprocessor or processor core, cause the at least one microprocessor or processor core to:
remove a part of connectivity information between the linkage node and a linkage circuit element;
update the part of the connectivity information by re-establishing interconnection between at least the extruded via and the linkage circuit element; and
store the connectivity information, which has been updated, in a non-transitory computer memory.

18. An article of manufacture comprising a non-transitory computer accessible storage medium having stored thereupon a sequence of instructions which, when executed by at least one microprocessor or processor core executing one or more threads, causes the at least one or processor core to perform a set of acts for model-based electronic design implementation with a hybrid solver, the set of acts comprising:
extruding an extruded via from a linkage node to a reference metal plane that is added to an analysis model for at least a portion of an electronic design;
generating the analysis model for analyzing, in a three-dimensional space, the at least the portion of the electronic design at least by re-establishing interconnection between the at least the portion of the electronic design and a linkage circuit element with the extruded via;
generating analysis or simulation results in the three-dimensional space at least by executing a hybrid solver module coupled with at least one microprocessor of a computing system on the analysis model, without requiring three-dimensional solver modules; and
implementing the at least the portion of the electronic design using the analysis or simulation results.

19. The article of manufacture of claim 18, the set of acts further comprising:
constructing the analysis model for the at least the portion of the electronic design at least by including the reference metal plane and the extruded via in the analysis model; and
forwarding the analysis model to the hybrid solver as an input model for the hybrid solver to determine electrical behavior of the at least the portion of the electronic design and to include the electrical behavior in the analysis or simulation results.

20. The article of manufacture of claim 18, the set of acts further comprising:

determining a first position in the analysis model for a first reference metal plane based in part or in whole upon one or more decoupling requirements; and adding the first reference metal plane at the first position in the analysis model.

21. The article of manufacture of claim 18, the set of acts further comprising:

determining a via clearance for one or more extruded vias including the extruded via;

modeling a medium for an artificial region created by the reference metal plane with one or more artificial properties; and adjusting at least one artificial property of the one or more artificial properties of the medium for the artificial region.

* * * * *